United States Patent [19]
Lautzenheiser

[11] Patent Number: 5,325,509
[45] Date of Patent: Jun. 28, 1994

[54] METHOD OF OPERATING A CACHE MEMORY INCLUDING DETERMINING DESIRABILITY OF CACHE AHEAD OR CACHE BEHIND BASED ON A NUMBER OF AVAILABLE I/O OPERATIONS

[75] Inventor: Marvin Lautzenheiser, San Jose, Calif.

[73] Assignee: Zitel Corporation, Fremont, Calif.

[21] Appl. No.: 79,966

[22] Filed: Jun. 21, 1993

Related U.S. Application Data

[63] Continuation of Ser. No. 665,021, Mar. 5, 1991, abandoned.

[51] Int. Cl.⁵ .............. G06F 13/00; G06F 12/06
[52] U.S. Cl. .............................. 395/425; 395/275; 364/DIG. 1
[58] Field of Search ................... 395/425, 275; 364/200 MS File, 900 MS File; 365/400

[56] References Cited

U.S. PATENT DOCUMENTS

| | | | |
|---|---|---|---|
| 4,394,733 | 7/1983 | Swenson | 395/425 |
| 4,433,374 | 2/1984 | Hanson et al. | 395/425 |
| 4,458,307 | 7/1984 | McAnlis et al. | 395/575 |
| 4,468,730 | 8/1984 | Dodd et al. | 395/425 |
| 4,490,782 | 12/1984 | Dixon et al. | 395/425 |
| 4,530,054 | 7/1985 | Hamstra et al. | 395/550 |
| 4,603,380 | 7/1986 | Easton et al. | 395/425 |
| 4,607,346 | 8/1986 | Hill | 395/425 |
| 4,611,289 | 9/1986 | Coppola | 364/492 |
| 4,835,686 | 5/1989 | Furuya et al. | 395/425 |
| 4,843,542 | 6/1989 | Dashiell et al. | 395/425 |
| 4,882,642 | 11/1989 | Tayler et al. | 360/78.11 |
| 4,888,691 | 12/1989 | George et al. | 395/700 |
| 4,908,793 | 3/1990 | Yamagata et al. | 365/52 |
| 4,959,774 | 9/1990 | Davis | 395/575 |
| 4,972,364 | 11/1990 | Barrett et al. | 395/425 |
| 5,133,060 | 7/1992 | Weber et al. | 395/425 |

OTHER PUBLICATIONS

"Methods For The Deployment of IBM 3880 Model 13 Cached Storage Controllers" By Paula T. Guttman, Comp. Mgmt. Group Int'l. Conference, San Francisco, Dec. 1984, pp. 44-53.

"Disc Caching In the System Processing Units of the HP 3000 Family of Computers", By John R. Busch & Alan J. Kondoff, Feb. 1985, Hewlett-Packard Journal, pp. 21-39.

(List continued on next page.)

Primary Examiner—Glenn Gossage
Attorney, Agent, or Firm—Steven F. Caserza

[57] ABSTRACT

A computer data storage device made up of both solid state storage and rotating magnetic disk storage maintains a fast response time approaching that of a solid state device for many workloads and improves on the response time of a normal magnetic disk for practically all workloads. The high performance is accomplished by a special hardware configuration coupled with unique procedures and algorithms for placing and maintaining data in the most appropriate media based on actual and projected activity. The system management features a completely searchless method (no table searches) for determining the location of data within and between the two devices. Sufficient solid state memory capacity is incorporated to permit retention of useful, active data, as well as to permit prefetching of data into the solid state storage when the probabilities favor such action. Movement of updated data from the solid state storage to the magnetic disk and of prefetched data from the magnetic disk to the solid state storage is done on a timely, but unobtrusive, basis as background tasks of the described device. A direct, private channel between the solid state storage and the magnetic disk prevents the conversations between these two media from conflicting with the transmission of data between the host computer and the described device. A set of microprocessors manages and oversees the data transmission and storage. Data integrity is maintained through a power interruption via a battery assisted, automatic and intelligent shutdown procedure.

11 Claims, 21 Drawing Sheets

OTHER PUBLICATIONS

IBM Systems Journal vol. 24 Nos. 3/4, 1985 "Cache-DASD Storage Design for Improving System Performance", By Grossman, pp. 316-334.

International Business Machines Corp.-"A Multiple Workload Approach to Cache Planning" By Bruce McNutt & James W. Murray, pp. 9-15.

CMG '87-The Computer Measurement Group, Inc., Orlando Dec. 7-11 1987-"BEST/1 Analysis of the IBM 3880-13 Cached Storage Controller" By Jeffrey P. Buzen & Anneliese Von Mayrhauser, pp. 156-173.

Computer Science Division, University of California, Berkeley, "Maximizing Performance in Striped Disk Array" By Peter M. Chen & David A. Patterson, pp. 322-331.

"Cache Memory Design: An Evolving Art" By Alan Jay Smith, IEEE Spectrum, Dec. 1987, pp. 40-44.

University of Wisconsin, "A Case For Direct-Mapped Caches" By Mark D. Hill, Computer, Dec. 1988, pp. 25-40.

IBM, Alamaden Research Center and Tucson Laboratory "The IBM 3990 Disk Cache", By Jai Menon and Mike Hartung, pp. 146-151.

The Computer Society of IEEE, Feb. 29-Mar. 4, 1988 "COMPCON88", Nippon Electric Co., Tokyo, Japan Integrated Disk Cache System With File Adaptive Control By Tokunaga et al., pp. 412-416.

1988 IEEE, Amperif Corporation, "The Amperif Cache Disk System" By Stephen Fuld pp. 156-157.

COMPCON88, Feb. 29-Mar. 4, 1988, Boole & Babbage, Inc., "DASD Cache Controllers: Performance Expectations and Measurements" By Kovach, pp. 74-78, IEEE Computer Society, Digest of Papers.

"Degradation of IMS Performance Using a 3880-23 Cache Controller" By Carolyn Hanna, pp. 15-21, Computer Measurement Group (CMG) Conference, Las Vegas, Dec. 9-12, 1986.

"Performance & Tuning of Cached I/O Subsystems", By Mark B. Friedman, pp. 717-727, Computer Measurement Group (CMG) Conference, Las Vegas, Dec. 9-12, 1986.

METHOD OF OPERATING A CACHE MEMORY INCLUDING DETERMINING DESIRABILITY OF CACHE AHEAD OR CACHE BEHIND BASED ON A NUMBER OF AVAILABLE I/O OPERATIONS

CROSS REFERENCE TO RELATED APPLICATIONS

This application is a continuation of U.S. application Ser. No. 07/665,021, filed Mar. 5, 1991, now abandoned.

INTRODUCTION

1. Field of the Invention

This invention relates to a high performance computer data storage device including a combination of solid state storage and a rotating magnetic disk device.

2. Description of Prior Art

A number of computer data storage systems exist which make some use of solid state memory devices as a caching controller for placement between a computer host device and rotating magnetic disk device. A typical caching system uses a single solid state memory unit as a holding area for data stored on a string of magnetic disks, thereby allowing certain information to be stored in performance as compared to the use solely of relatively lower speed disk memories, i.e. the percentage of times a desired piece of data is contained in the high speed cache memory, thereby allowing faster access as compared with when that data is only stored in a disk drive. A block diagram of such a system is shown in FIG. 1. Host computer 101 communicates with the entire string 102 of disks 102-1 through 102-N via cache unit 103 via Host interface 104, such as Small Computer Systems Interface (SCSI). All data going to or from disk string 102 passes through the cache-to-disk data path consisting of host interface 104, cache unit 103, and disk interface 105. Cache unit 103 manages the caching of data and services requests from host computer 101. Major components of cache unit 103 include microprocessor 103-1, cache management hardware 103-2, cache management firmware 103-3, address lookup table 103-4, and solid state cache memory 103-5.

The prior art cache system of FIG. 1 is intended to hold frequently accessed data in a solid state memory area so as to give more rapid access to that data than would be achieved if the same data were accessed from the disk media. Typically, such cache systems are quite effective when attached to certain host computers and under certain workloads. However, there exist some drawbacks and, under certain conditions, such cache systems exhibit a performance level less than that achieved by similar, but uncached, devices. Some of the factors contributing to the less than desirable performance of prior art cached disk devices are now described.

The single cache memory 103-5 is used in conjunction with all disks in disk string 102. Data from any of the disks may reside in cache memory 103-5 at any given time. The currently accessed data is given precedence for caching data is cached regardless of the disk drive on which it resides. When fulfilling a host command, the determination of whether or not the data is in cache memory 103-5, and the location of that data in cache memory 103-5, is usually via hashing schemes and table search operations. Hashing schemes and table searches can introduce time delays of their own which can defeat the purpose of the cache unit itself.

Performance is very sensitive to cache-hit rates. Due to caching overhead and queuing times, a low hit rate in a typical string oriented cache system can result in overall performance that is poorer than that of configured uncached string of disks.

The size of cache memory 103-5 relative to the capacity of disk drives 102 is generally low. An apparently obvious technique to remedy a low hit rate is to increase the cache memory 103-5 size. However, it has been found that there is an upper limit to the size of cache memory 103-5 above which adding more capacity has limited benefits. With limited cache memory 103-5 capacity, a multitude of requests over a variety of data segments exhausts the capability of the cache system to retain the desirable data in cache memory 103-5. Often, data that would be reused in the near future is decached prematurely to make room in cache memory 103-5 for handling new requests from the host computer 101. The result is a reduced cache hit rate. A reduced hit rate increases the number of disk accesses; increased disk accesses increases the contention on the data path. A self-defeating cycle is instituted.

"Background" cache-ahead operations are limited since the data transferred during such cache ahead operations over the same data path as, and often conflicts with, the data transferred to service direct requests from the host computer 101. The data path between cache unit 103 and disk string 102 can easily be overloaded. All data to and from any of the disks in disk string 102, whether for satisfying requests from host computer 101 or for cache management purposes, travels across the cache-to-disk path. This creates a bottleneck if a large amount of prefetching of data from disk string 102 to cache memory 103-5 occurs. Each attempt to prefetch data from disk string 102 into cache memory 103-5 potentially creates contention for the path with data being communicated between any of the disk drives of disk string 102 and host computer 101. As a result, prefetching of data into cache memory 103-5 must be judiciously limited; increasing the size of the cache memory 103-5 beyond a certain limit does not produce corresponding improvements in the performance of the cache system. This initiates a string of related phenomena. Cache-ahead management is often limited to reading succeeding data into cache from disk on each host read command which is a cache read miss. This technique helps to minimize the tendency of cache-ahead to increase the queuing of requests waiting for the path between cache memory 103-5 and disk string 102. However, one of the concepts on which caching is based is that data accesses tend to be concentrated within a given locality within a reasonably short time frame. For example, data segments are often accessed in sequential fashion. Limiting the cache-ahead operations to being a function of read misses can have the negative effect of lowering the cache hit rate since such limitation may prevent or degrade the exploitation of the locality of data accesses.

A variety of algorithms and configurations have been devised in attempts to optimize the performance of string caches. A nearly universally accepted concept involves the retention and replacement of cached data segments based on least-recently used (LRU) measurements. The decaching of data to make room for new data is managed by a table which gives, for each cached block of data, its relative time since it was last accessed. Depending on the algorithm used, this process can also result in some form of table search with a potential measurable time delay.

Cache memory 103-5 is generally volatile; the data is lost if power to the unit is removed. This characteristic, coupled with the possibility of unexpected power outages, has generally imposed a write-through design for handling data transferred from host computer 103 to the cached string. In such a design, all writes from host computer 103 are written directly to disk; handled at disk speed, these operations are subject to all the inherent time delays of seek, latency, and lower transfer rates commonly associated with disk operations.

Cache unit 103 communicates with the string of disk drives 102 through disk interface 105.

SUMMARY OF THE INVENTION

Computer operations and throughput are often limited by the time required to write data to, or read data from, a peripheral data storage device. A solid state storage device has high-speed response, but at a relatively high cost per megabyte of storage. A rotating magnetic disk, optical disk, or other mass media provides high storage capacity at a relatively low cost per megabyte, but with a low-speed response. The teachings of this invention provide a hybrid solid state and mass storage device which gives near solid state speed at a cost per megabyte approaching that of the mass storage device. For the purposes of this discussion, embodiments will be described with regard to magnetic disk media. However, it is to be understood that the teachings of this invention are equally applicable to other types of mass storage devices, including optical disk devices, and the like.

This invention is based on several features: a rotating magnetic disk media, an ample solid state storage capacity, a private channel between the disk and solid state storage devices, microprocessors which perform unique data management, a unique prefetch procedure, and simultaneous cache, disk, and host operations. The hybrid storage media of this invention performs at near solid state speeds for many types of computer workloads while practically never performing at less than normal magnetic disk speeds for any workload.

A rotating magnetic disk media is used to give the device a large capacity; the solid state storage is used to give the device a high-speed response capability. By associating the solid state media directly with a single magnetic disk device, a private data communication line is established which avoids contention between normal data transfers between the host and the device and transfers between the solid state memory and the disk. This private data channel permits virtually unlimited conversation between the two storage media. Utilization of ample solid state memory permits efficient maintenance of data for multiple, simultaneously active data streams. Management of the storage is via one or more microprocessors which utilize historical and projected data accesses to perform intelligent placement of data. No table searches are employed in the time-critical path. Accesses to data stored in the solid state memory are at solid state speeds; accesses to data stored on the magnetic disk are at disk device speeds. All data sent from the host to the device is handled at solid state speeds.

BRIEF DESCRIPTIONS OF THE DRAWINGS

DESCRIPTION OF THE TABLES

Figure 1:
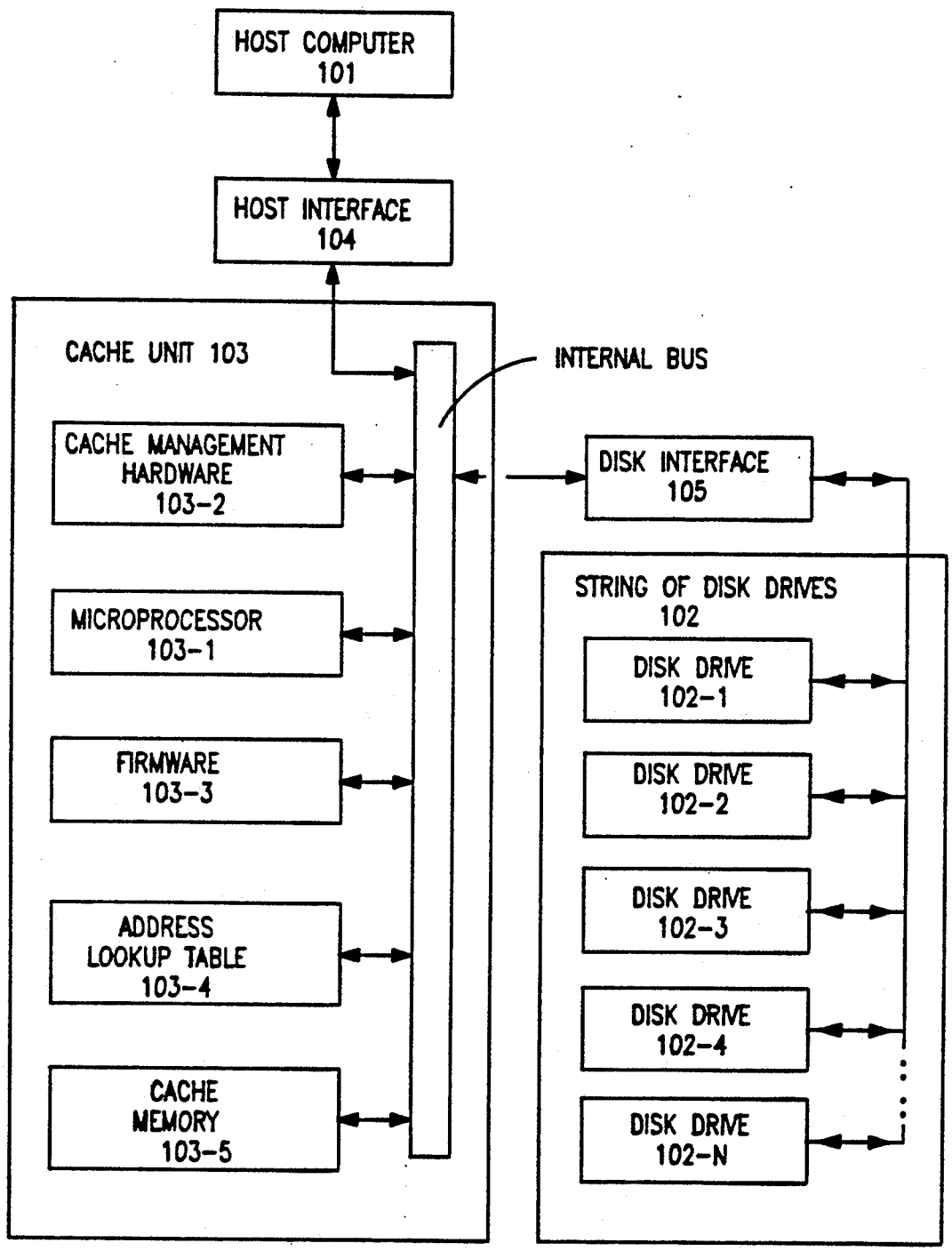
FIG. 1 is a block diagram of a typical prior art cached disk computer data storage system.

Tables F-1 through F-4 describe the organization of Tables T-1 through T-4, respectively;

Table T-1 depicts an example of values in the address translation (ADT) table prior to the handling of the first I/O operation from the host CPU;

Table T-2 depicts an example of values in the Least-Recently-Used (LRU) table prior to the handling of the first I/O operation from the host CPU;

Table T-3 describes the least recently used (LRU) table;

Tables T-3a through T-3e depict the ADT table after various numbers of I/O operations; and Table 4 depicts a sample of I/O commands extracted from computer system operations during normal usage. These I/O commands, and the intervening commands, were the basis for the sample predicted LRU and ADT tables as shown in Tables T-1 through T-3.

DETAILED DESCRIPTION OF THE INVENTION

Glossary of Terms

ADDRESS TRANSLATION: The conversion of a sector address into a track address and sector offset within the track.

CACHE-AHEAD FACTOR; PROXIMITY FACTOR: At each track hit or rehit, data sufficient to satisfy a number of I/O's may remain in front of, and/or behind, the current location of the data involved in the current I/O. When either of these two remaining areas contain space for less than a set number of I/O's, the cache-ahead is activated. That minimum number of potential I/O's is the cache-ahead factor, or the proximity factor.

ADDRESS TRANSLATION TABLE; ADT TABLE: The table which maintains the relationship between disk track identifiers and solid state memory addresses; also holds other information as required.

CACHE: The solid state memory area which holds frequently accessed user data with the cache system of this invention, taken as a whole.

CPU SECTOR: See Logical Sector.

DISK; MAGNETIC DISK; ROTATING MAGNETIC DISK: A rotating magnetic media disk drive.

DISK SECTOR ADDRESS: The address of a physical sector on the magnetic disk.

DISK SERVER: The logical section of the cache system of this invention which handles the writes to, and reads from, the rotating magnetic disk.

DISK TRACK ADDRESS; TRACK ADDRESS: The address of the first sector of data in a given track on disk. These addresses correspond to physical locations on the rotating magnetic disk. Each sector address as specified in an I/O operation can be converted into a track address and a sector offset within that track.

DMA: Direct Memory Access; that is, memory-to-memory transfer without the involvement of the processor.

DRAM: Dynamic random access memory. The chip or chips that are used for solid state memory devices.

EDAC: Error Detection And Correction.

EEPROM: Electrically Erasable Programmable Read-Only Memory.

EPROM: Erasable Programmable Read-Only Memory.

HOST: The computer to which the cache system of this invention is attached.

HOST SERVER: The portion of the cache system of this invention which interfaces with the host computer.

LRU: Least-Recently-Used, as pertains to that data storage track which has not been accessed for the longest period of time.

LRU TABLE; LEAST-RECENTLY-USED TABLE: The table containing the information which allows the controller to determine which solid state memory data areas may be reused with the least impact on the cache efficiency.

MRU: Most-Recently-Used, as pertains to that data storage track which has been accessed in the nearest time past.

PHYSICAL TRACK; DISK TRACK: A complete data track on a disk; one complete magnetic band on one platter of the disk device.

PROXIMITY FACTOR: See CACHE AHEAD FACTOR.

RECYCLE: The term used to describe the retention of a track in cache beyond its arrival at the LRU position; such retention to be based on the fact the track was reused at some time since it was placed in cache as a result of a read miss, a caching operation, or a cache-ahead operation, or since it was last given preference for retention in cache by the recycling mechanism.

SCSI: Small Computer System Interface; the name applied to the protocol for interfacing devices, such as a disk device to a host computer.

SCSI CONTROL CHANNEL: A physical connection between devices which uses the SCSI protocol, and is made up of logical controllers connected by a cable.

SECTOR: The logical sub-unit of a disk track; the smallest addressable unit of data on a disk.

SOLID STATE MEMORY, SOLID STATE DEVICE; SSD: Storage media made up of solid state devices such as DRAMs.

SSD TRACK ADDRESS: The address in the solid state memory at which the first byte of the first sector of a given disk track resides.

TRACK; LOGICAL TRACK; LOGICAL BLOCK: A logical data track on disk, or its equivalent in SSD; may or may not be identical to a physical track on disk (one complete magnetic band on one platter of the disk unit). It is noted that an I/O operation may involve more than one logical block.

System Overview

In accordance with the teachings of this invention, a computer peripheral data storage device is provided comprising a combination solid state memory and rotating magnetic disk; such device having the large capacity of magnetic disk media with near solid state speed at a cost per megabyte approaching that of magnetic disk media. For the purposes of this discussion, embodiments will be described with regard to magnetic disk media. However, it is to be understood that the teachings of this invention are equally applicable to other types of mass storage devices, including optical disk devices, and the like.

The device of this invention derives its large storage capacity from the rotating magnetic disk media. Its high speed performance stems from the combination of a private channel between the two storage media, multiple microprocessors utilizing a set of unique data management algorithms, a unique prefetch procedure, simultaneous cache, disk, and host operations, and an ample solid state memory. This hybrid storage media gives overall performance near that of solid state memory for most types of computer workloads while practically never performing at less than normal magnetic disk speeds for any workload.

To the host computer, the device of this invention appears to be a single, directly addressable entity. By the combination, within the device, of a solid state memory and one or more magnetic disk device, private data communication lines are established within the device which avoids contention between normal data transfers between the host and the device, and transfers between the solid state memory and the disk media. This private data channel permits unrestricted data transfers between the two storage media with practically no contention with the communication between the host computer and the described device. Utilization of ample solid state memory permits efficient retention of data for multiple, simultaneously active data streams. Management of the storage is via microprocessors which anticipate data accesses based on historical activity. Data is moved into the solid state memory from the disk media based on management algorithms which insure that no table searches need be employed in the time-critical path. Host computer accesses to data stored in the solid state memory are at near solid state speeds; accesses to data stored on the magnetic disk are at near disk device speeds. All data sent from the host to the device is transferred at solid state speeds limited only by the channel capability.

Hardware Description

Figure 2:
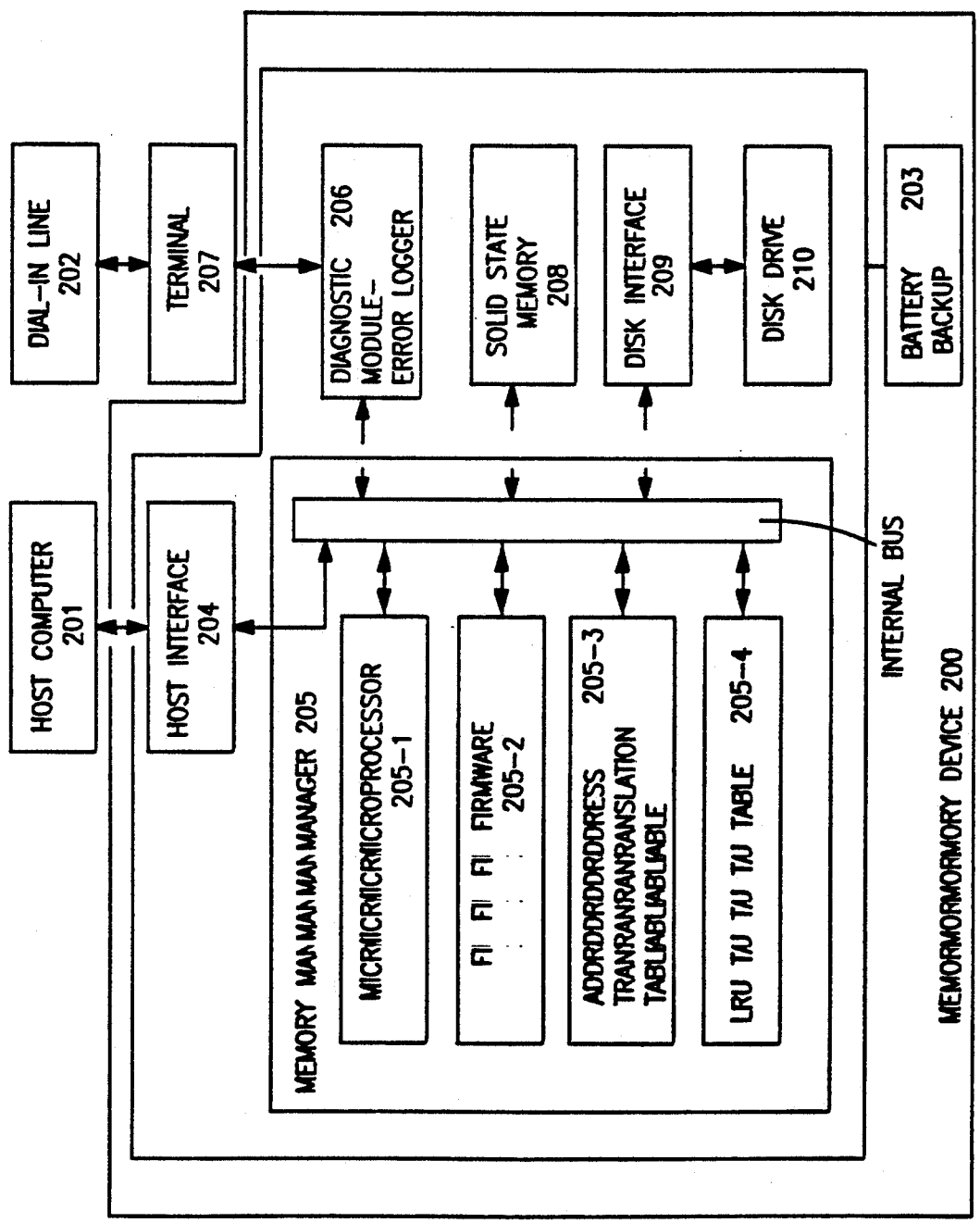
FIG. 2 is a block diagram depicting one embodiment of a cached disk computer data storage device constructed in accordance with the teachings of this invention.

A device constructed in accordance with the teachings of this invention is depicted in FIG. 2. Memory device 200 is a self-contained module which includes three points of contact with other devices. Its primary contact is with host computer 201 via host interface 204. Host interface 204 comprises, for example, a dedicated SCSI control processor which handles communications between host computer 201 and memory manager 205. An operator interface is provided via the console 207, which allows the user to exercise overall control of the memory device 200. Other points of contact are to terminal 207 (such as a personal computer) for interrogating system status or the operating condition of memory device 200, and a telephone dial-in line 202 which can access via computer/terminal 207.

Memory manager 205 handles all functions necessary to manage the storage of data in, and retrieval of data from, disk drive 210 (or high capacity memory devices) and solid state memory 208, the two storage media. The memory manager 205 consists of one or more microprocessors 205-1, associated firmware 205-2, and management tables, such as Address Translation (ADT) Table 205-3 and Least Recently Used (LRU) Table 205-4.

Solid state memory 208 is utilized for that data which memory manager 205, based on its experience, deems most useful to host computer 201, or most likely to become useful in the near future.

Magnetic disk drive 210 is the ultimate storage for all data, and provides the needed large storage capacity. Disk interface 209 serves as a separate dedicated control processor (such as an SCSI processor) for handling communications between memory manager 205 and disk drive 210.

Information about functional errors and operational statistics are maintained by diagnostic module error logger 206. Access to module 206 is obtained through dial-in line 202 or console 207. Console 207 serves as the operator's access to the memory device 200 for such actions as powering the system on and off, reading or resetting the error logger, or inquiring of system statistics.

The memory device 200 includes power backup system 203 which includes a rechargeable battery. Backup system 203 is prepared to maintain power to memory device 200 should normal power be interrupted. If such a power interruption occurs, the memory manager 205 takes whatever action is necessary to place all updated data stored in solid state memory 208 onto magnetic disk 210 before shutting down memory device 200.

Figure 3:
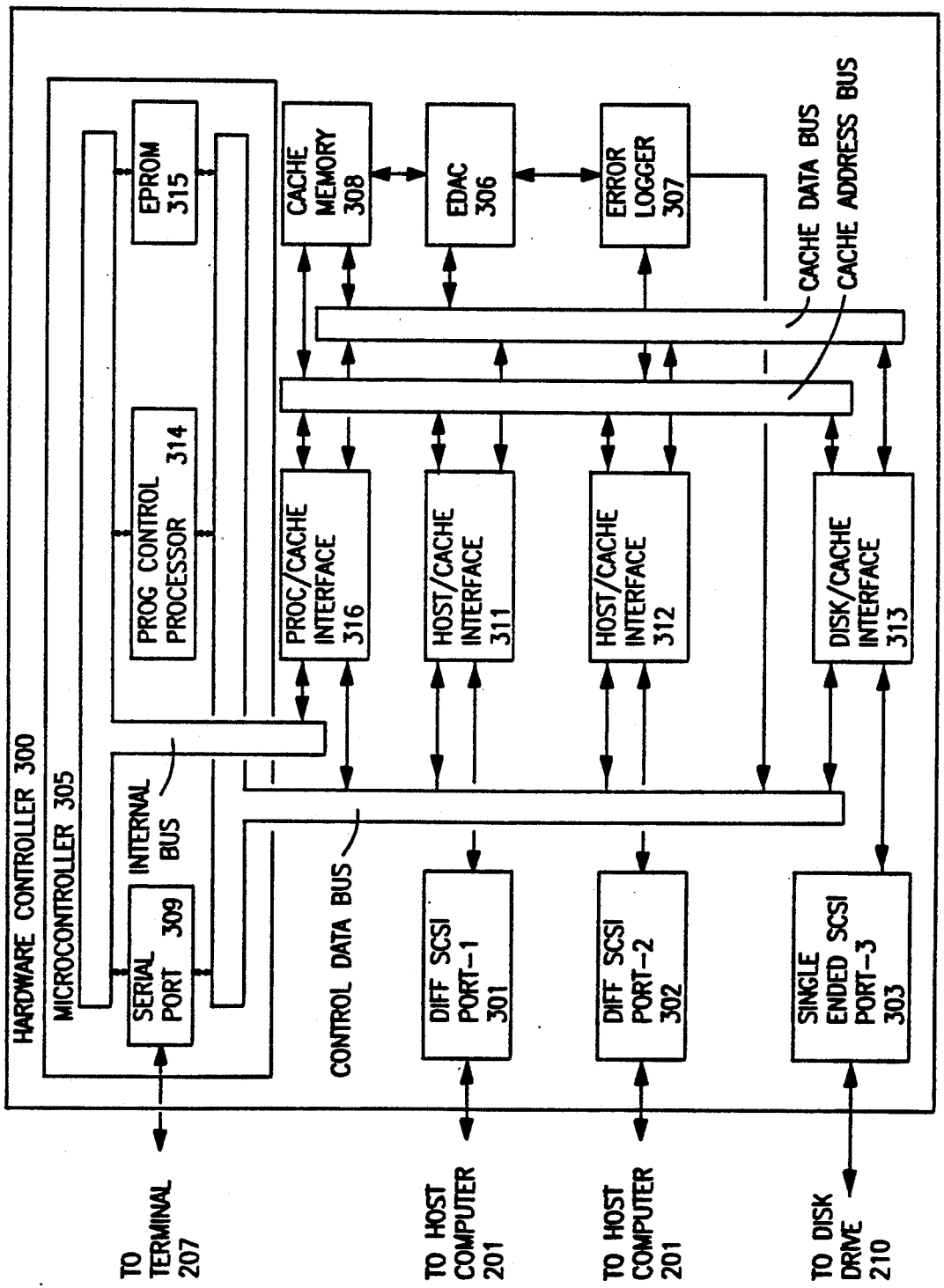
FIG. 3 is a block diagram depicting one embodiment of a controller which implements the described invention.

FIG. 3 depicts a hardware controller block diagram of one embodiment of this invention. As shown in FIG. 3, hardware controller 300 provides three I/O ports, 301, 302, and 303. I/O ports 301 and 302 are differential SCSI ports used to connect hardware controller 300 to one or more host computers 201 (FIG. 2). I/O port 303 is a single-ended SCSI port used to connect controller 300 to disk drive 210 (which in this embodiment is a 5.25" magnetic hard disk drive). Disk drive 210 provides long-term non-volatile storage for data that flows into controller 300 from host computers 201. "Differential" and "single-ended" refer to specific electrical characteristics of SCSI ports; the most significant distinction between the two lies in the area of acceptable I/O cable length. The SCSI aspects of I/O ports 301, 302, and 303 are otherwise identical.

Cache memory 308 (corresponding to memory 208) is a large, high-speed memory used to store, on a dynamic basis, the currently active and potentially active data. The storage capacity of cache memory 308 can be selected at any convenient size and, in the embodiment depicted in FIG. 3, comprises 64 Megabytes of storage. Cache memory 308 is organized as 16 Megawords; each word consists of four data bytes (32 bits) and seven bits of error-correcting code. Typically, the storage capacity of cache memory 308 is selected to be within the range of approximately one-half of one percent (0.5%) to 100 percent of the storage capacity of the one or more magnetic disks 210 (FIG. 2) with which it operates. A small portion of cache memory 308 is used to store the tables required to manage the caching operations; alternatively, a different memory (not shown, but accessible by microcontroller 305) is used for this purpose.

Error Detection and Correction (EDAC) circuitry 306 performs error detecting and correcting functions for cache memory 308. In this embodiment, EDAC circuitry 306 generates a seven-bit error-correcting code for each 32-bit data word written to cache memory 308; this information is written to cache memory 308 along with the data word from which it was generated. The error-correcting code is examined by EDAC circuitry 306 when data is retrieved from cache memory 308 to verify that the data has not been corrupted since last written to cache memory 308. The modified Hamming code chosen for this embodiment allows EDAC circuitry 306 to correct all single-bit errors that occur and detect all double-bit and many multiple-bit errors that occur.

Error logger 307 is used to provide a record of errors that are detected by EDAC circuitry 306. The information recorded by error logger 307 is retrieved by microcontroller 305 for analysis and/or display. This information is sufficiently detailed to permit identification by microcontroller 305 of the specific bit in error (for single-bit errors) or the specific word in error (for double-bit errors). In the event that EDAC circuitry 306 detects a single-bit error, the bit in error is corrected as the data is transferred to whichever interface requested the data (processor/cache interface logic 316, host/cache interface logic 311 and 312, or disk/cache interface logic 313). A signal is also sent to microcontroller 305 to permit handling of this error condition (which involves analyzing the error based on the contents of error logger 307, attempting to scrub (correct) the error, and analyzing the results of the scrub to determine if the error was soft or hard).

In the event that EDAC circuitry 306 detects a double-bit error, a signal is sent to microcontroller 305. Microcontroller 305 will recognize that some data has been corrupted. If the corruption has occurred in the ADT or LRU tables, an attempt is made to reconstruct the now-defective table from the other, then relocate both tables to a different portion of cache memory 308.

If the corruption has occurred in an area of cache memory 308 that holds user data, microcontroller 305 attempts to salvage as much data as possible (transferring appropriate portions of cache memory 308 to disk drive 210, for example) before refusing to accept new data transfer commands. Any response to a request for status from the host computer 201 will contain information that the host computer 201 may use to recognize that memory device 200 is no longer operating properly.

Microcontroller 305 includes programmable control processor 314 (for example, an 80C196 microcontroller available from Intel Corporation of Santa Clara, Calif.), 64 kilobytes of EPROM memory 315, and hardware to allow programmable control processor 314 to control the following: I/O ports 301, 302, and 303, cache memory 308, EDAC 306, error logger 307, host/cache interface logic 311 and 312, disk/cache interface logic 313, processor/cache interface logic 316, and serial port 309.

Programmable control processor 314 performs the functions dictated by software programs that have been converted into a form that it can execute directly. These software programs are stored in EPROM memory 315.

In one embodiment, the host/cache interface logic sections 311 and 312 are essentially identical. Each host/cache interface logic section contains the DMA, byte/word, word/byte, and address register hardware that is required for the corresponding I/O port (301 for 311, 302 for 312) to gain access to cache memory 308. Each host/cache interface logic section also contains hardware to permit control via microcontroller 305. In this embodiment I/O ports 301 and 302 have data path widths of eight bits (byte). Cache memory 308 has a data path width of 32 bits (word).

Disk/cache interface logic 313 is similar to host/cache interface logic sections 311 and 312. It contains the DMA, byte/word, word/byte, and address register hardware that is required for disk I/O port 303 to gain access to cache memory 308. Disk/cache interface logic 313 also contains hardware to permit control via microcontroller 305. In this embodiment, I/O port 303 has a data path width of eight bits (byte).

Processor/cache interface logic 316 is similar to host/cache interface logic sections 311 and 312 and disk/cache interface logic 313. It contains the DMA, half-word/word, word/half-word, and address register hardware that is required for programmable control processor 314 to gain access to cache memory 308. Processor/cache interface logic 316 also contains hardware to permit control via microcontroller 305. In this embodiment, programmable control processor 314 has a data path width of 16 bits (half-word).

Serial port 309 allows the connection of an external device (for example, a small computer) to provide a human interface to the system 200. Serial port 309 permits initiation of diagnostics, reporting of diagnostic results, setup of system 200 operating parameters, monitoring of system 200 performance, and reviewing errors recorded inside system 200. In other embodiments, serial port 309 allows the transfer of different and/or improved software programs from the external device to the control program storage (when memory 315 is implemented with EEPROM rather the EPROM, for example).

Formats of Control Tables

Format of Address Translation (ACT) Table

The Address Translation Table, along with the LRU table, maintains the information required to manage the caching operations. There are two sections in the ADT table, the indexed, or tabular portion, and the set of unindexed, or single-valued items.

The unindexed portion of the ADT table contains two types of data fields; the first are those items which are essential to the cache management, the second category contains those data items which maintain records of system performance.

The first group of unindexed items, or those requisite to the cache management, includes the following single-valued items.

1) ADT-CNL. The number of tracks on the cached disk spindle; also equals the number of lines in the ADT table. This is set at the time the system is configured and is not changed while the system is in operation.

2) ADT-HEAD-POS. The current position of the read/write head of the cache disk. This is updated every time the head is positioned.

3) ADT-SWEEP-DIR. The direction in which the current sweep of the background writes is progressing. This is updated each time the sweep reverses its direction across the disk.

4) ADT-MOD-COUNT. The total number of tracks in the cache which have been modified by writes from the host and are currently awaiting a write to disk by the Disk server. This is increased by one whenever an unmodified cache track is updated by the host, and it is decreased by one whenever a modified cache track is copied to the cache disk.

The second group of unindexed items are those which record system performance, and are all used to compute the current operating characteristics of the system. They include the following single-valued items.

1) ADT-READ-HITS. The number of cache read-hits encountered since the last reset. This value is set to zero by a reset operation from the terminal. It is incremented by one for each read I/O which is entirely satisfied from data which is resident in the cache memory.

2) ADT-READ-MISSES. The number of cache read-misses encountered since the last reset. This value is set to zero by a reset operation from the terminal. It is incremented by one for each read I/O which is cannot be entirely satisfied from data which is resident in the cache memory.

3) ADT-WRITE-HITS. The number of cache write-hits encountered since the last reset. This value is set to zero by a reset operation from the terminal. It is incremented by one for each read I/O for which the corresponding track or tracks are found to be in cache memory.

4) ADT-WRITE-MISSES. The number of cache write-misses encountered since the last reset. This value is set to zero by a reset operation from the terminal. It is incremented by one for each read I/O for which at least one of the corresponding tracks is not found to be in cache memory.

There is one line in the tabular portion for each data track on the spindle. A line is referred to by its line number, or index. That line number directly corresponds to a track number on the disk. When the host wants to access or modify data on the disk, it does so by referencing a starting sector address and indicating the number of sectors to be accessed or modified. For caching purposes, the starting sector address is converted into a track identifier and offset within that track.

A disk sector address is converted into a track number and a sector offset by dividing it by the number of sectors per track. The remainder is the offset into the track. The quotient is the track identifier and is the index into the ADT table. Using this index, the condition of the specified disk track can be determined directly from data in the ADT table; no search is required to determine cache-hits or misses.

Each ADT line contains the following items:

1) ADT-SLOT. There is a one-to-one correspondence between lines in the ADT table and the logical tracks on the disk. If the logical track on the disk corresponding to a given ADT table line is cached, the ADT-SLOT field of that ADT line contains the number which corresponds to the logical block in the cache which contains a copy of the data which resides in the corresponding logical track on the disk. By design, the value in ADT-SLOT also points to the line in the LRU table related to the cached disk track. If the data contained in the track on the disk is not in cache, the value in this field is meaningless and is set to zero. It is by means of this field that cache-hits can be serviced completely without any table search.

2) ADT-CACHED. A flag indicating whether or not the corresponding disk track is stored in the cache. This marker is updated each time a track is entered into or removed from the SSD area.

3) ADT-MODIFIED. A flag indicating whether or not the corresponding cached track has been modified by a write operation from the host, and thus, needs to be copied from the cache to the disk.

4) ADT-LOCKED. A flag indicating whether or not the corresponding cached track is currently the target of some operation, such as being acquired from the disk, being modified by the host, or being written to the disk by the cache controller.

Format of Least Recently Used (LRU) Table

The LRU table maintains the information relative to the times when cached tracks of data were last accessed. This information is necessary for the system to always be aware of which cache slots are available for overwriting whenever uncached data tracks must be placed in cache. Its contents also provide redundancy for the data kept in the ADT table, thus contributing to system reliability.

There are two sections in the LRU table, the indexed, or tabular portion, and the set of unindexed, or single-valued items. The unindexed portion of the LRU table contains data required to manage the caching process. The tabular portion is composed of pointers for LRU chaining purposes, pointers into the ADT table, and the recycle control markers.

It is by means of this LRU information and the ADT table information that the system determines which cached track to overwrite when a cache area is needed for an uncached disk track. The unindexed items are requisite to the cache management, and includes the following single-valued items.

1) LRU-CNL. The number of track-equivalents slots in the cache area; this is equal to the number of lines in the LRU table.

2) LRU-LRU. The LRU-LRU table element points to the cache area track-slot containing the cached data which has been left untouched for the longest time. It is updated when new activity for the referenced slot makes it no longer the least-recently-used. The referenced slot is the top candidate for overwriting when new data must be written into the cache.

3) LRU-MRU. The LRU-MRU table element points to the cache area track-slot containing the cached data which has been most recently reference by the host. LRU-MRU is updated every time a track is touched by either a read or a write from the host. At that time, the address of the accessed track is placed in LRU-MRU and the LRU chains are updated in the indexed portion of the LRU table.

There is one line in the tabular portion for each cache area slot in the cache data area. A line is referred to by its line number, or index. That line number directly corresponds to a slot in the cache data area.

Each LRU table line contains three pointer fields plus a recycle control field:

1) LRU-TRACK. The pointer to the ADT line which references the disk track currently resident in the corresponding cache slot. By design, this value is also the identifier of the disk track whose data currently resides in the corresponding cache slot, if any.

2) LRU-LAST. This is part of the bidirectional chaining of the cache data slots. LRU-LAST is the pointer to the next-older (in usage) cache slot. If this slot is the oldest, LRU-LAST will contain a zero.

3) LRU-NEXT. This is the other half of the bidirectional chaining of the cache data slots. LRU-NEXT is the pointer to the next newer (in usage) cache slot. If this slot is the newest, LRU-NEXT will contain a zero.

4) LRU-RECYCLE. A single bit marker which indicates whether or not the corresponding track is a candidate for recycling. It is set to 1 (on) whenever the track is reused; it is set to 0 (off) when the track is recycled (moved to the MRU position). It is initially set to 0 when a track is brought into cache as a result of a cache-ahead decision. For a track brought in to satisfy a cache miss, it is set to 1.

EXAMPLES OF TABLES

Initial ADT Table

When a system is first powered on, the ADT table is in an indeterminate state. In order to become operational, initial values must be entered into their appropriate table elements. Initial values for unindexed fields of the ADT table are as follows:

The ADT-CNL field must be set to the size of the cache disk as a number of tracks.

the ADT-HEAD-POS field is set to zero to indicate the head is currently at the edge of the disk. This may, or may not, be true, but it does not matter, it will become correct on the first access to the disk.

The ADT-SWEEP-DIR field is arbitrarily set to one ("1") to indicate the head is moving in an upward (based on track addresses) direction. This will be corrected at the initiation of the first background sweep.

The ADT-MOD-COUNT field is set to zero to reflect the fact that no modified tracks are waiting in cache to be copied to disk.

The ADT-READ-HITS field is set to zero to reflect the fact that no cache hits have occurred during read operations.

The ADT-READ-MISSES field is set to zero to reflect the fact that no cache misses have occurred during read operations.

The ADT-WRITE-HITS field is set to zero to reflect the fact that no cache hits have occurred during write operations.

The ADT-WRITE-MISSES field is set to zero to reflect the fact that no cache misses have occurred during write operations.

All indexed fields of all lines of the ADT table are initially set to zero to indicate that no tracks are resident in cache.

Initial LRU Table

When a system is first turned on, the LRU table is in an indeterminate state. In order to become operational, initial values must be entered into their appropriate table elements. While there are many acceptable ways to initialize the chaining fields, a simple one has been selected, and is described here.

Initial values for unindexed fields of the LRU table are as follows:

The LRU-CNL field must be set to the size of the cache, as a number of track-equivalent slots.

The LRU-LRU field is set to one to represent the lowest numbered cache slot as being the oldest. This is an arbitrary choice in keeping with the chaining values selected, below.

The LRU-MRU field is set equal to LRU-CNL to represent the highest cache slot as being the most recently used. This is an arbitrary choice in keeping with the initial chaining values selected, below.

Initial values for indexed fields of the LRU table are as follows:

The LRU-TRACK field of every line of the LRU table is set to zero to indicate that no disk data tracks are currently held in cache.

The LRU-LAST field of every line of the LRU table is set to that line's index minus one. This action, along with the settings for the LRU-NEXT values, produces a chained list suitable for the cache start-up operation.

The LRU-NEXT field of every line, except the highest, of the LRU table is set to that line's index plus one. The LRU-NEXT field of the highest line is set to zero. These settings, along with the settings for the LRU-LAST values, produce a chained list suitable for the cache start-up operation.

The LRU-RECYCLE field of every line of the LRU table is set to zero to indicate that no slot is currently a candidate for recycling.

Operational state ADT tables

The operational state ADT table examples illustrate the conditions after the very first (sample) I/O has occurred and after the system has reached a fully active condition. These fully active examples show the effects of several I/O's on the state of the ADT table contents. Also included in these examples is the effect of a background sweep which wrote modified tracks from cache to disk. A detailed description of these specific sample operations appears under the LRU table discussion, below.

Operational state LRU tables

The operational state LRU table examples illustrate the conditions after the very first I/O has occurred and after the system has reached a fully active condition. These fully active examples show the effects of several I/O's on the state of the LRU table contents.

Description of Sample I/O's

For purposes of illustration, a sample of I/O's where chosen to be discussed in detail. Those chosen for discussion are I/O numbers 1, 1000, 1001, and 1002 taken from a trace of actions at an operational site; they are detailed in Table 4 as projected into the described system. The following discussions of the sample I/O's include the effects on both the ADT and the LRU tables.

Actions related to I/O operation number 1:

1. This I/O is a read involving disk track numbers 46 and 47; since nothing is in cache, it must be a cache-miss, and the tracks must be brought into cache. The ADT table is modified to show the locations of the tracks in the cache. The LRU table is updated to indicate the presence of the two tracks in cache, the chains are relinked to show the tracks as the MRU and next-to-MRU tracks, and they are both marked for recycling. They are marked for recycling since they will have been used at least once by the time they reach the LRU position in the chain.

2. Based on the I/O size and the difference from the end of the data requested in I/O operation number 1 to the end of track 47, a prefetch of track 48 is initiated. That activity is not reflected in the ADT and LRU tables since it is initiated as a background operation after the completion of the current I/O.

After 999 I/O's have occurred, the ADT and LRU tables have reached a certain status. Based on that status, the following actions relate to I/O operation number 1000:

1. This I/O is a read involving track 56 which is not in cache; it must be brought into cache and put at the MRU position in the LRU chain. To make room for this track, the old LRU track was decached.

2. A read I/O operation does not affect the need for a background sweep. There are three tracks in cache that need to be copied to disk; this condition remains unchanged by the current I/O.

3. Several cache slots have been marked for recycling, including the slot at the LRU end of the chain and the slot it points to. Before any prefetch is initiated, these will be moved to the MRU and next-to-MRU positions and their recycle markers will have been removed.

4. Since track 57 is already in cache, no prefetch is needed for it.

5. The size of the I/O (68 sectors) and the current I/O's proximity to the first sector in track 56 indicate that track 55 should be prefetched by a cache-ahead action. That prefetch will be initiated as a background operation. Based on the LRU chain and the recycling situation, track 55 will be cached into slot 3. For the moment it will occupy the MRU position in the chain.

Actions related to I/O operation number 1001:

1. Prefetching of track 55, which was initiated by I/O 1000 has now been completed.

2. I/O number 1001 is a write involving tracks 61 and 62 which are both resident in the cache. The LRU and ADT table references to them are updated.

3. This I/O action modified two cached tracks, bringing the total number of tracks which need written to disk up to the trigger point for the background sweep.

4. The background sweep is initiated and starts writing the modified tracks from cache to disk.

5. Since the background sweep is using the disk spindle, no cache-ahead is initiated, even though the system would consider the prefetch of track 60 into cache.

Actions related to I/O operation number 1002:

1. The background sweep completed writing all modified tracks from cache to disk; it then went into the dormant state.

2. I/O 1002 was a write involving track 214 which is already resident in cache. The track is marked in the ADT table as having been modified. In the LRU table, track 214 in slot number 13 is rechained to the MRU position.

3. A prefetch of track 215 is initiated since the position of the current I/O in track 214 is near enough to the end of the track to warrant a cache-ahead operation. This activity does not appear in the ADT and LRU tables for I/O 1002 since it will occur in the background after the completion of the current I/O.

4. Since a prefetch of track 215 has been initiated, track 213 is not considered for prefetching.

FIRMWARE

Firmware Overview

Figure 4:
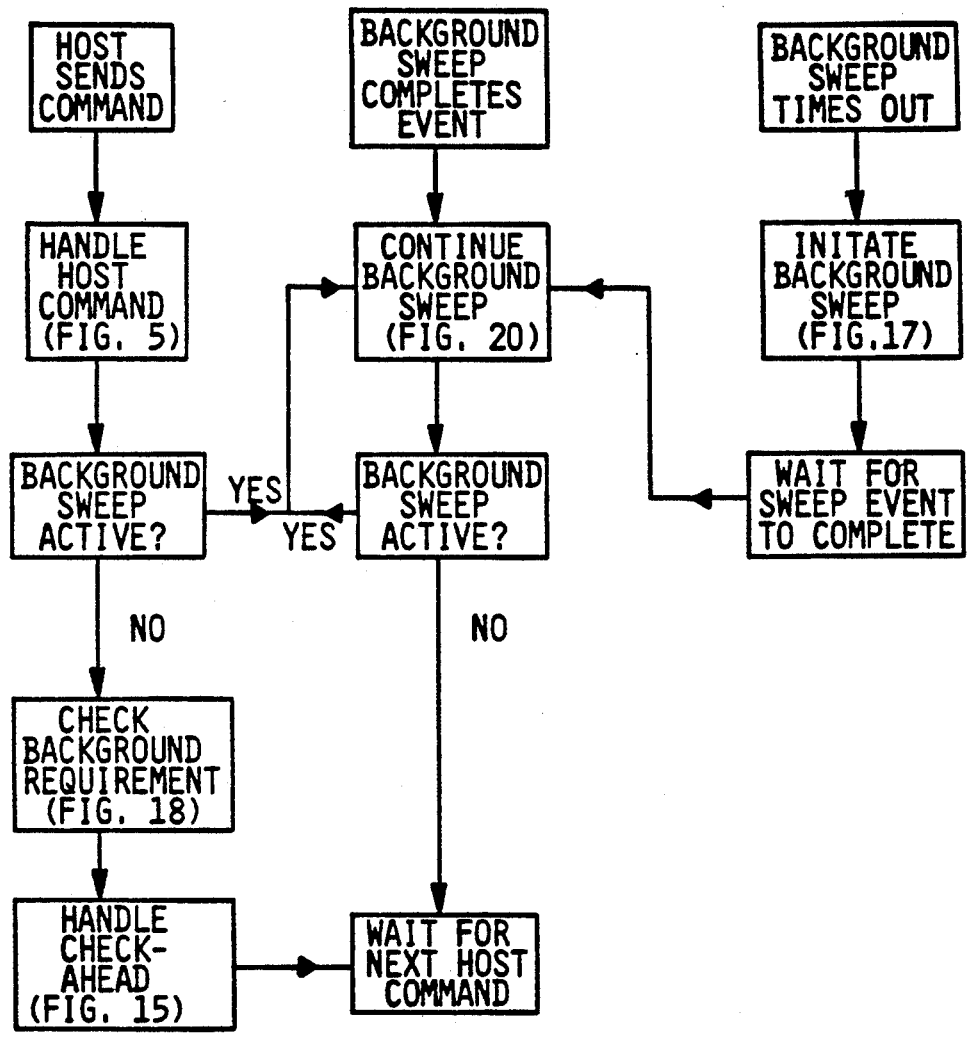
FIG. 4 is a flow chart depicting the operation of one embodiment of this invention.

The memory controller of this invention goes into a semi-dormant state when there is no activity that it needs to handle. As depicted in the flow chart of FIG. 4, there are three types of occurrences that may cause the controller to become active:
1. The host computer sends a command;
2. The background sweep completes an event;
3. The background sweep times out.

Insofar as possible, the host computer commands are given priority over other memory device activities. Thus, when a command is received from the host, it is immediately turned over to the Host Command Handler (described elsewhere). At the completion of the activity called for by that command, the memory controller determines if the background sweep is active. If it is not active, the background status is inspected and action is taken as appropriate, as described later with regard to the background check. Following the background status check, the cache-ahead status is checked, as described later with regard to the cache-ahead management. The controller then waits for the next host command. The controller may not be completely inactive at this time, inasmuch as either the background sweep or the cache-ahead may have initiated or continued some disk activity. If the background was found to be active, its activity is continued until such time as it has no more immediate work to do, as described later with regard to background continuation.

When the background sweep completes a command, the controller is given an interrupt with a signal that indicates the sweep needs its attention. At that time, the controller initiates the next sweep event, if any is waiting, and sets up a subsequent sweep event, also based on need, as described later with regard to the background continuation. At the completion of each sweep event, the controller determines if there is a need to continue the sweep. If no such need exists, the background sweep is placed in the dormant state. In either case, when the controller has completed its housekeeping, it becomes inactive awaiting its next task.

The background sweep can be activated in either of two ways; it will be activated when a set number of cached tracks have been modified and are in need of being written from cache to disk. The sweep may also be activated by a timeout. A timeout occurs whenever the sweep is inactive, and there exists any modified track waiting to be written from cache to disk which has been waiting more than a preset amount of time. When a timeout occurs, the controller is signaled that the sweep requires its attention. The controller initiates the background sweep (see description of background initiation) and, after completing the appropriate housekeeping, awaits the next command or event requiring its attention. The background sweep itself continues in operation until there is no more immediate need for its services. At that time it is returned to the dormant state.

Host-Command Management

Figure 5:
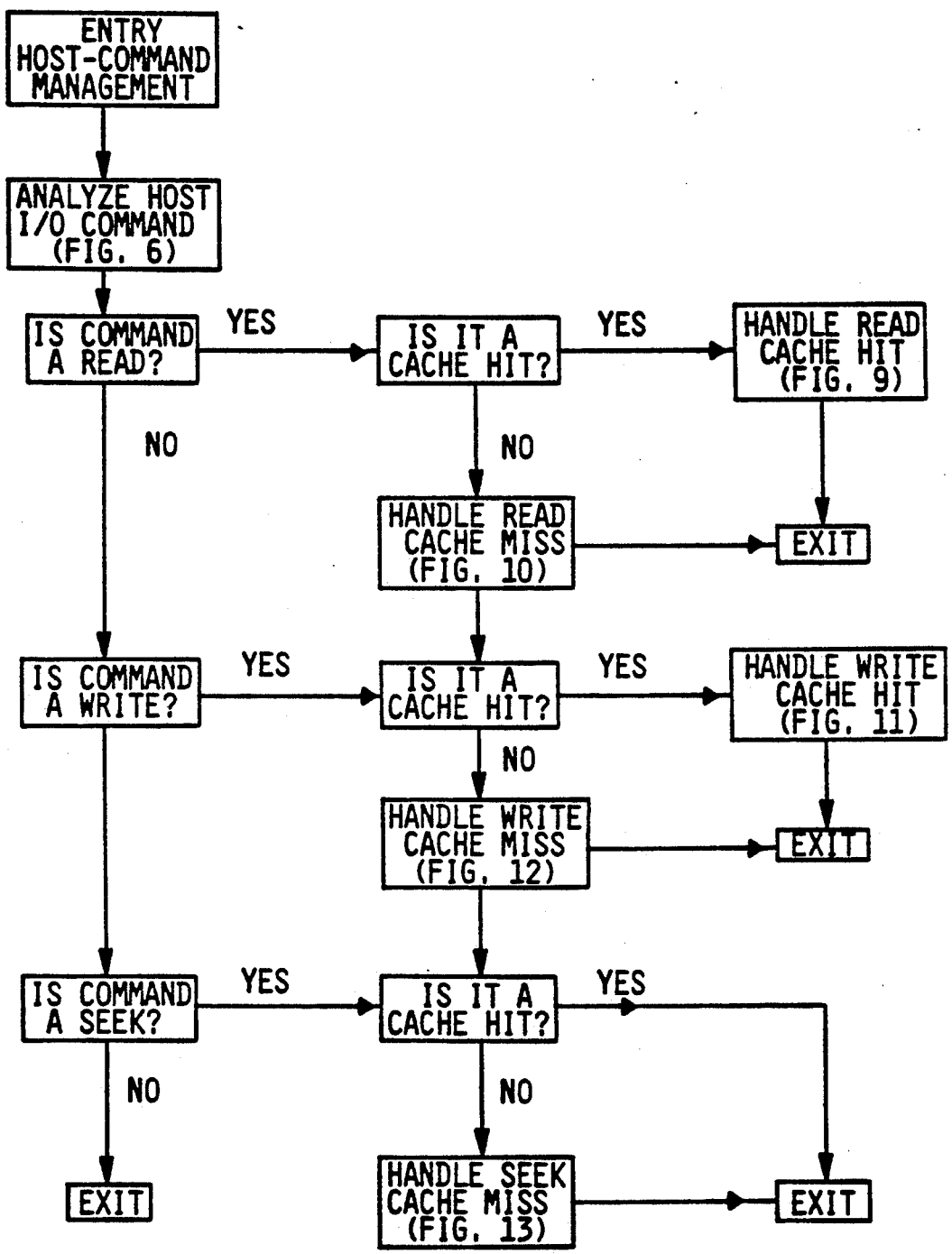
FIG. 5 is a flow chart depicting a more detailed description of the operation of the host command step of FIG. 4.

Whenever a command is received from the host computer, it is given the highest possible priority and handled as depicted in FIG. 5. To determine what actions are required, the command must be analyzed. A portion of the firmware is dedicated to that purpose (see description of host command analysis). The analysis of the command determines the type of command (read, write, seek, or other) and, where meaningful, will make a cache hit/miss determination. The analysis also sets up a table of one or more lines which will be used later in servicing the command.

If the command is a read and it can be serviced entirely from cache (i.e. a cache hit), the command is serviced by the read-hit portion of the controller (see description of read-hit handling).

If any portion of the read cannot be serviced from cached tracks (i.e. a cache miss), the command is turned over to the read-miss portion of the controller (see description of the read-miss handling).

If the command is a write and all tracks involved in the operation are already in cache, the command is serviced by the write-hit portion of the controller (see description of write-hit handling).

If any portion of the write involves an uncached track or tracks, the command is turned over to the write-miss portion of the controller (see description of the write-miss handling).

If the command is a seek, and the target track is already cached, no action is required. If the target track is not cached, the command is turned over to the seek-miss portion of the controller (see description of seek-miss handling).

Analyze Host I/O Command

Figure 6:
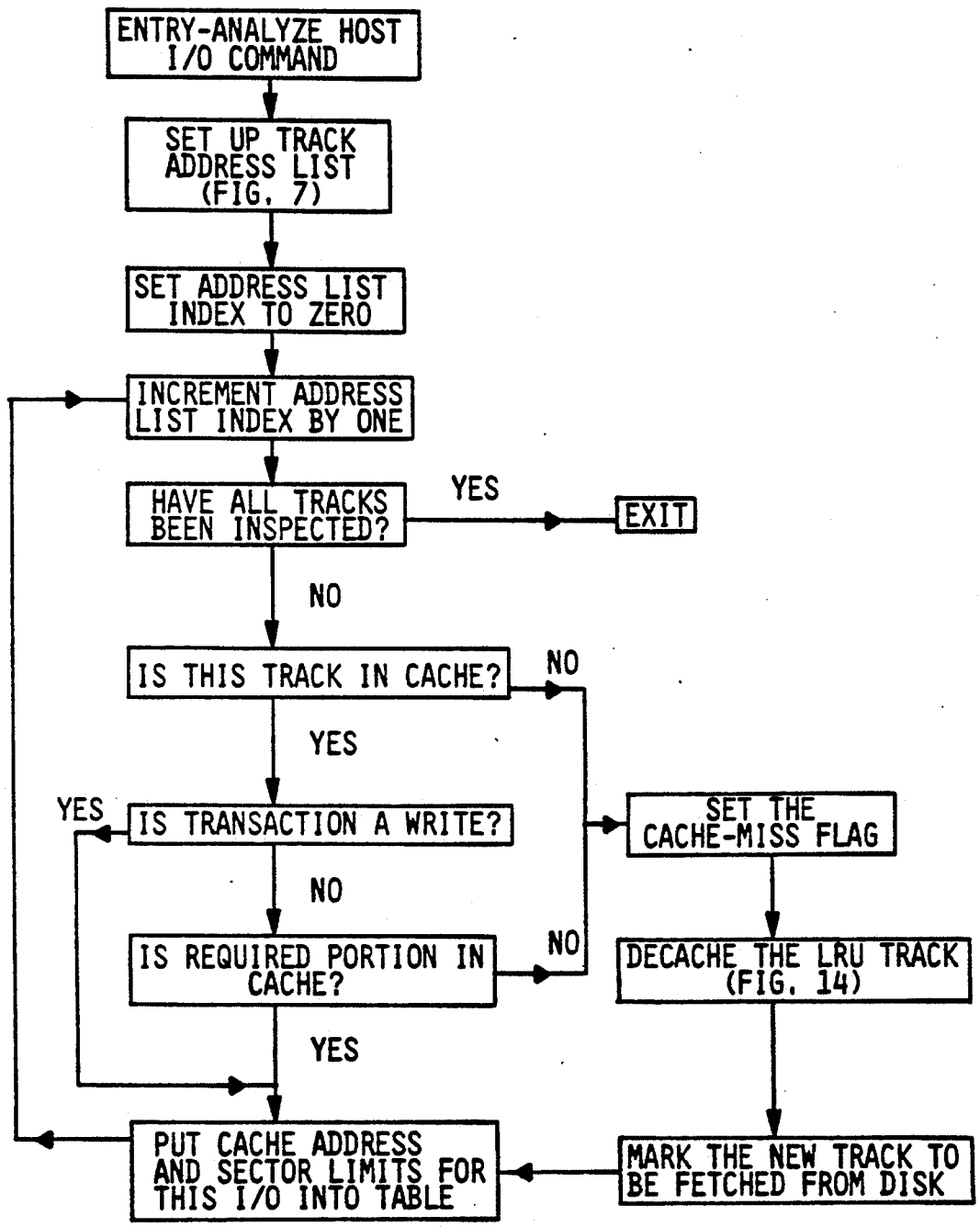
FIG. 6 is a flow chart depicting the operation of one embodiment of the analyze host I/O command operation of FIG. 5.

As depicted in FIG. 6, the analysis of a host command includes creation of a track address list which contains the locations of each track involved in the operation (see description of track address list setup). For each such track, the list contains the track's current location in cache, if it already resides there; or where it will reside in cache after this command and related caching activity have been completed. In the case that a track is not already cached, the space for it to be put into in cache in located, and the current track resident in that space is decached. The analysis includes setting the cache hit/miss flag so that the controller logic can be expedited.

Set Up Track Address List

Figure 7:
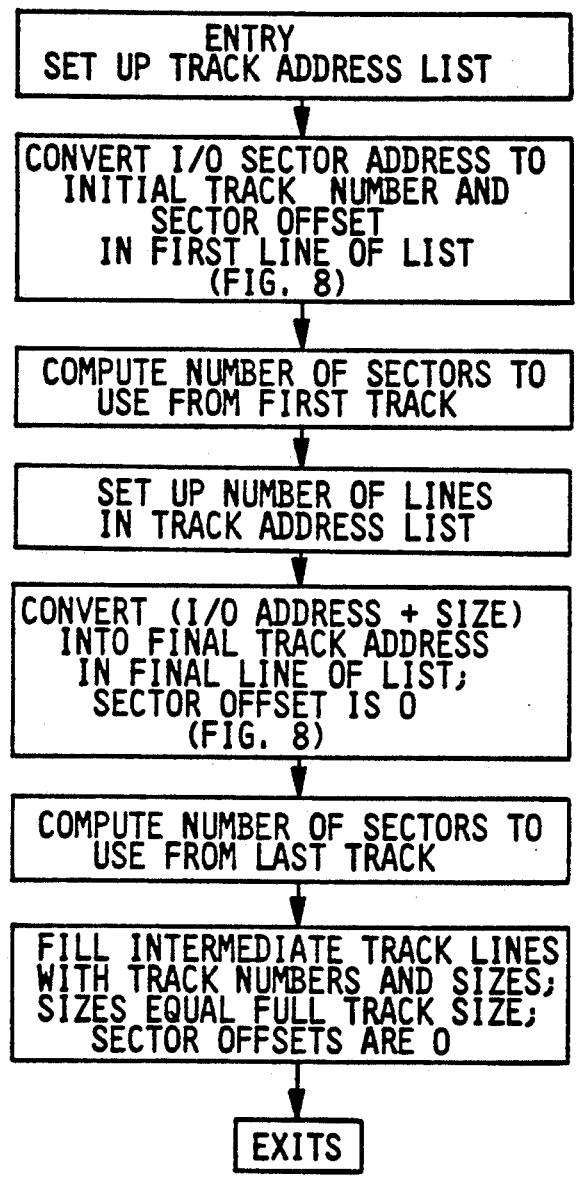
FIG. 7 is a flow chart depicting in more detail the operation of the setup track address list operation of FIG. 6.

As shown in FIG. 7, the controller segment which sets up the track address list uses the I/O sector address and size to determine the disk track identifying numbers for each track involved in the I/O operation (see description of address translation). The number of tracks involved is also determined, and for each track, the portion of the track which is involved in the operation is calculated.

Address Translation

Figure 8:
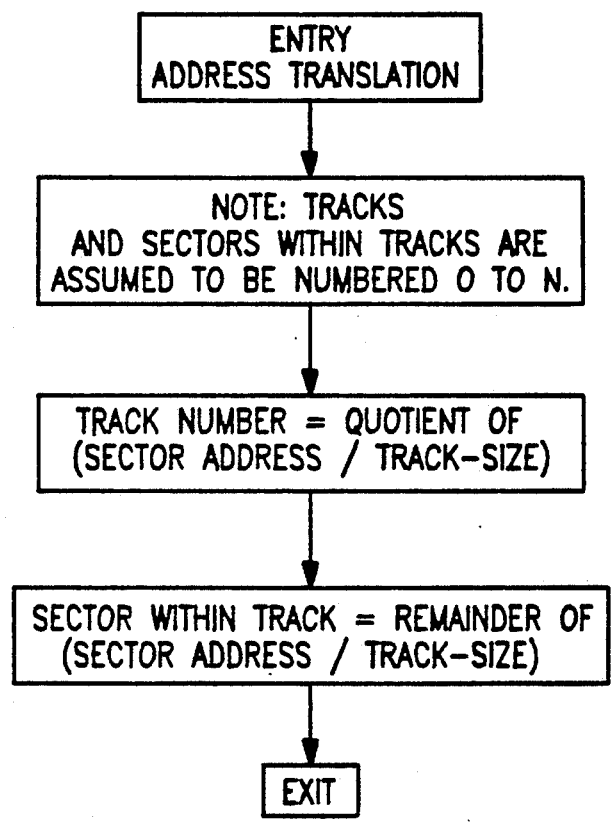
FIG. 8 is a flow chart depicting in more detail the address translation of FIG. 7.

FIG. 8 describes the operation for this translation. A sector address can be converted into a track address by dividing it by the track size. The quotient will be the track number, and the remainder will be the offset into the track where the sector resides.

Cache Read-Hit Operation

Figure 9:
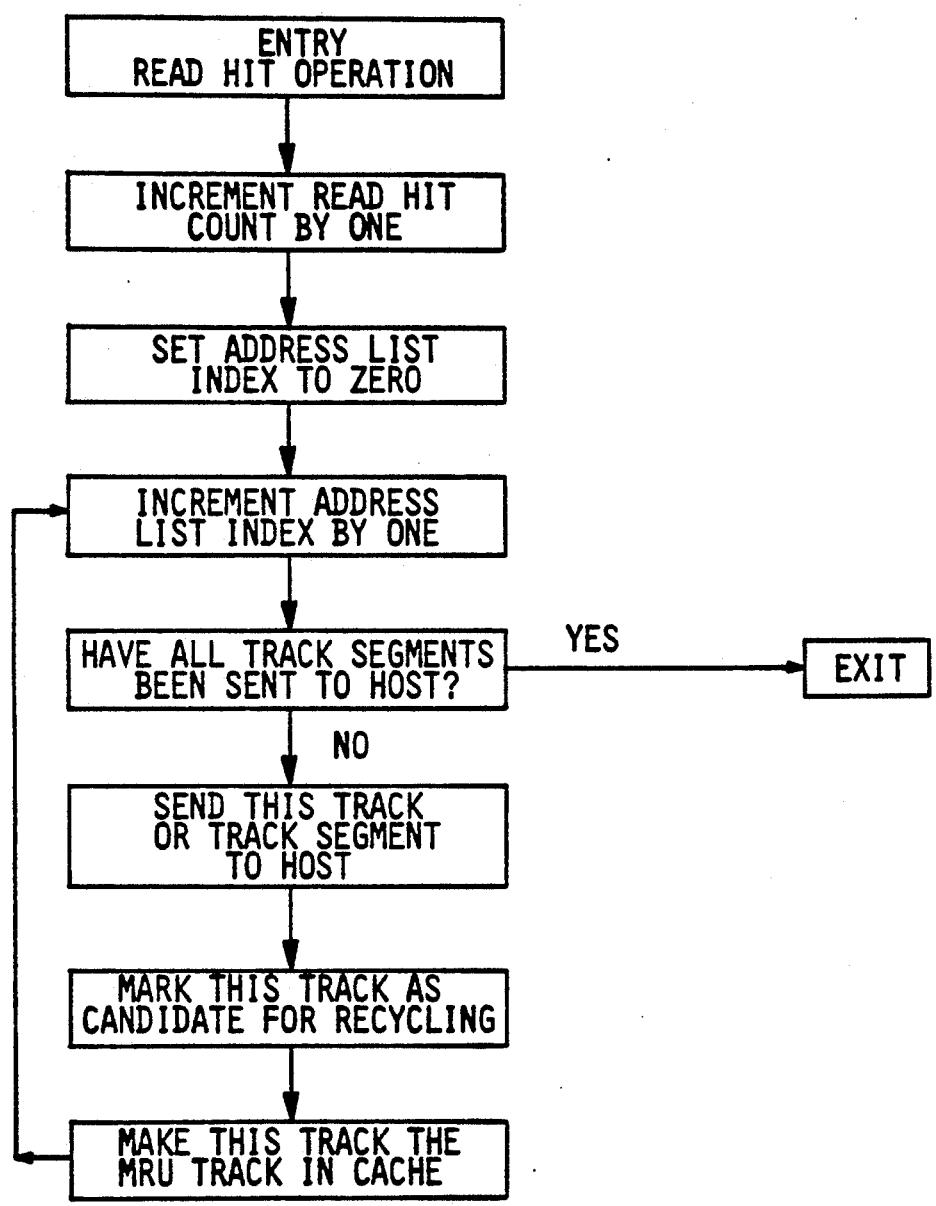
FIG. 9 is a flow chart depicting the cache read hit operation depicted in FIG. 5.

Refer to FIG. 9. A cache read hit is satisfied entirely from the cached data. In order to reach this module of the controller, the command will have been analyzed and the track address table will have been set up. With this preliminary work completed, the host read command can be satisfied by using each line of the track address table as a subcommand control. Since all affected tracks are already in cache, all required data can be sent directly from the cache to the host. In addition to transferring the data to the host, this module will rechain the affected tracks to become the most-recently-used tracks in the LRU table.

Cache Read-Miss Operation

Figure 10:
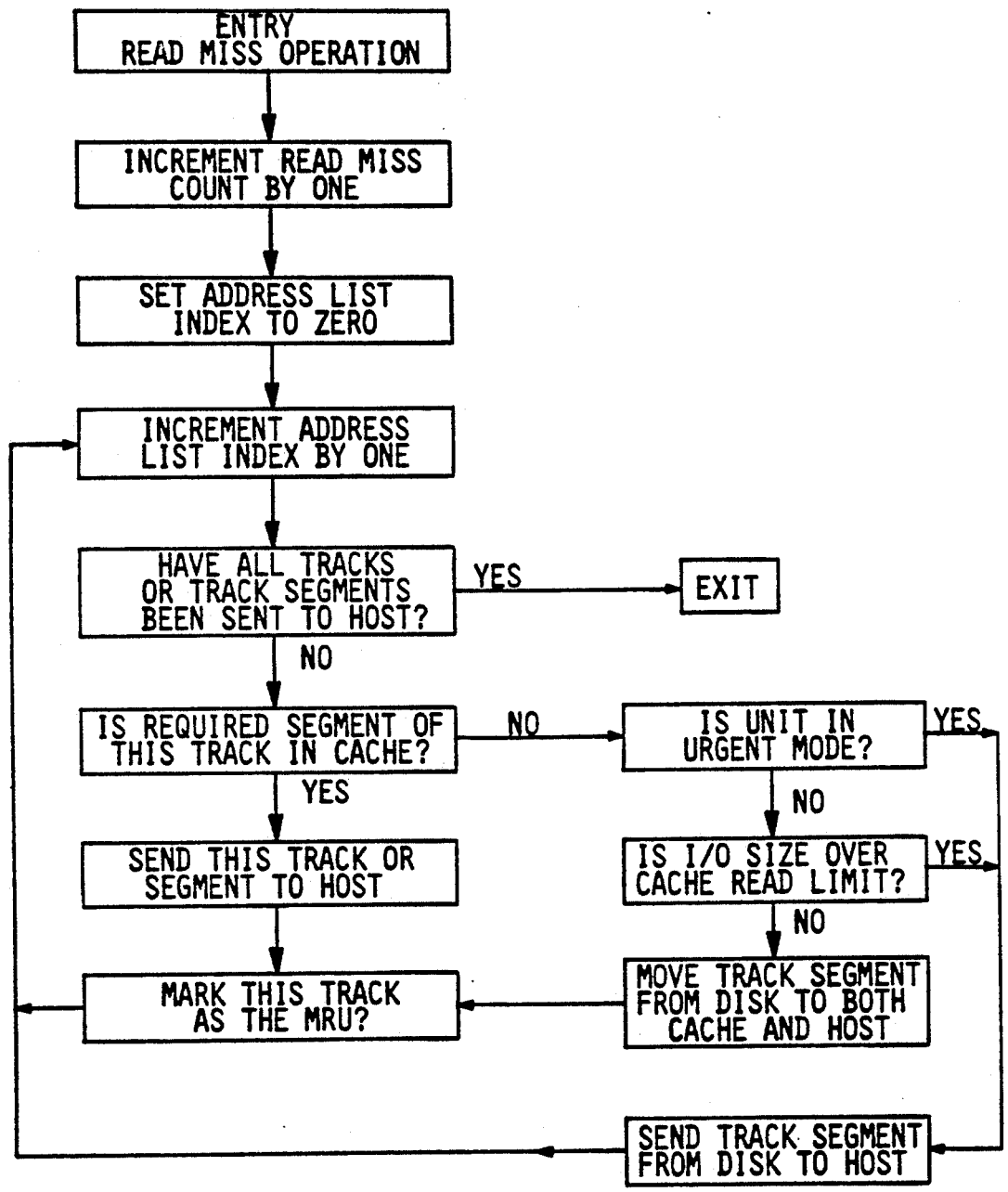
FIG. 10 is a flow chart depicting in more detail the cache read miss operation depicted in FIG. 5.

A cache read miss (FIG. 10) is satisfied in part or wholly from the disk. In order to reach this module of the controller, the command will have been analyzed and the track address table will have been setup. With this preliminary work completed, the host read command can be satisfied by using each line of the track address table as a subcommand control. For tracks which are already in cache, the data can be sent directly from the cache to the host. For tracks not resident in the cache, the data is sent from the disk to the host, and simultaneously to the cache. For any partial tracks sent to the host, the whole track will be sent to cache. In addition to transferring the data to the host, this module will rechain the affected tracks to become the most-recently-used tracks in the LRU table.

Cache Write-Hit Operation

Figure 11:
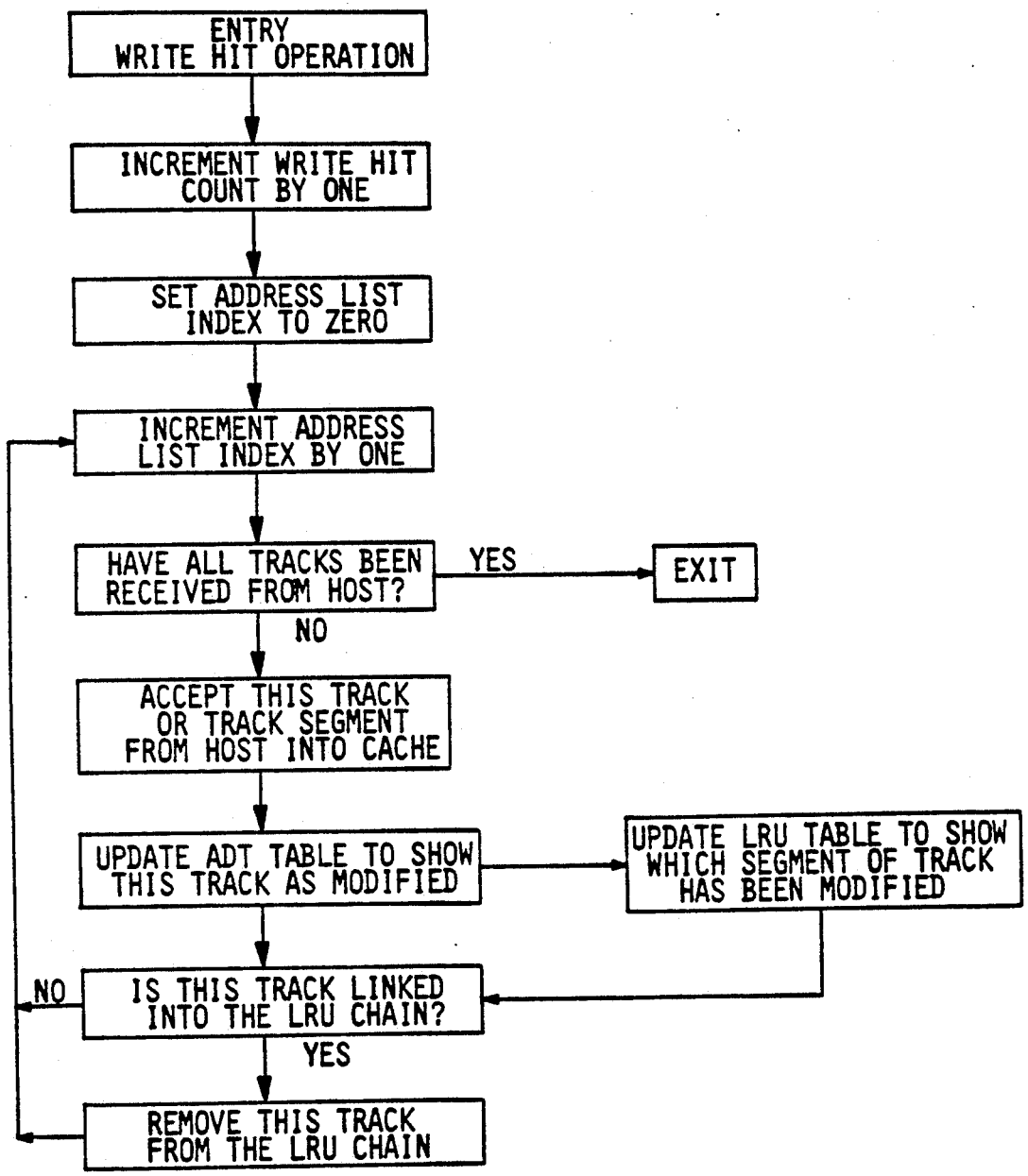
FIG. 11 is a flow chart depicting the cache write hit operation of FIG. 5.

A cache write hit (FIG. 11) is handled entirely within the cache. In order to reach this module of the controller, the command will have been analyzed and the track address table will have been set up. With this preliminary work completed, the host write command can be satisfied by using each line of the track address table as a subcommand control. Since all affected tracks are already in cache, all data can be sent directly from the host to the cache without any concern for post-transfer caching of partial tracks. In addition to transferring the data to the cache, this module will rechain the affected tracks to become the most-recently-used tracks in the LRU table.

Write Miss Operation

Figure 12:
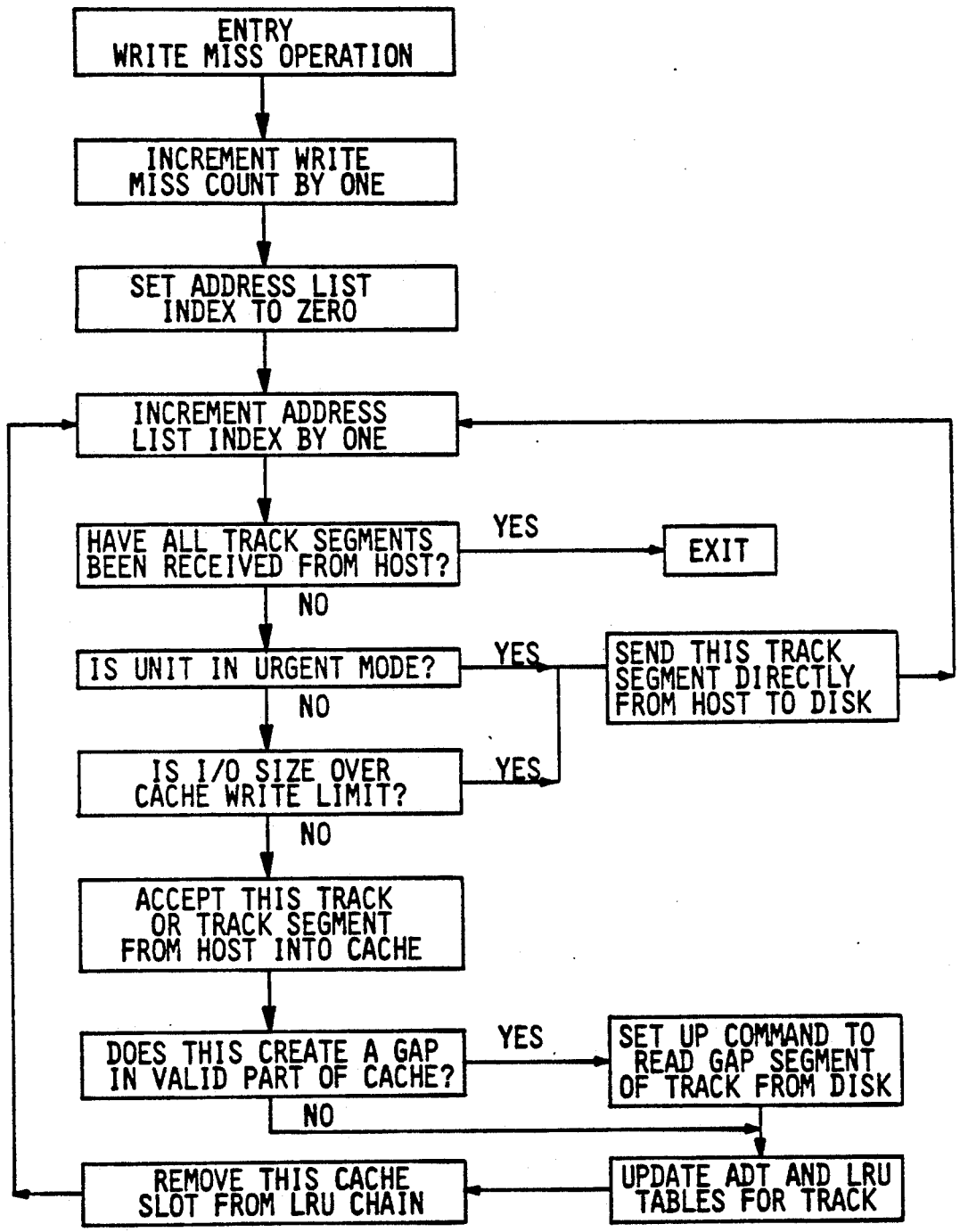
FIG. 12 is a flow chart depicting the cache write miss operation of FIG. 5.

A cache write miss is handled entirely within the cache, but requires post-transfer caching of data from the disk into cache of any partial tracks that were involved, as depicted in FIG. 12. In order to reach this module of the controller, the command will have been analyzed and the track address table will have been set up. With this preliminary work completed, the host write command can be satisfied by using each line of the track address table as a subcommand control. Since this is a cache-miss, some or all of the affected tracks are not in cache; however, all data can be sent directly from the host to the cache.

The cache controller has the responsibility for post-transfer caching of any partial tracks. In actuality, only the first and/or last tracks involved in the transfer can be partial tracks; all interior tracks must be full tracks, and thus require no post-transfer staging in any case. For those tracks requiring post-transfer caching, the controller sets up a list of caching events to bring any required track segments into cache to maintain the integrity of the cached tracks. In addition to transferring the data to the cache, this module rechains the affected tracks to become the most-recently-used tracks in the LRU table.

Seek Cache Miss

Figure 13:
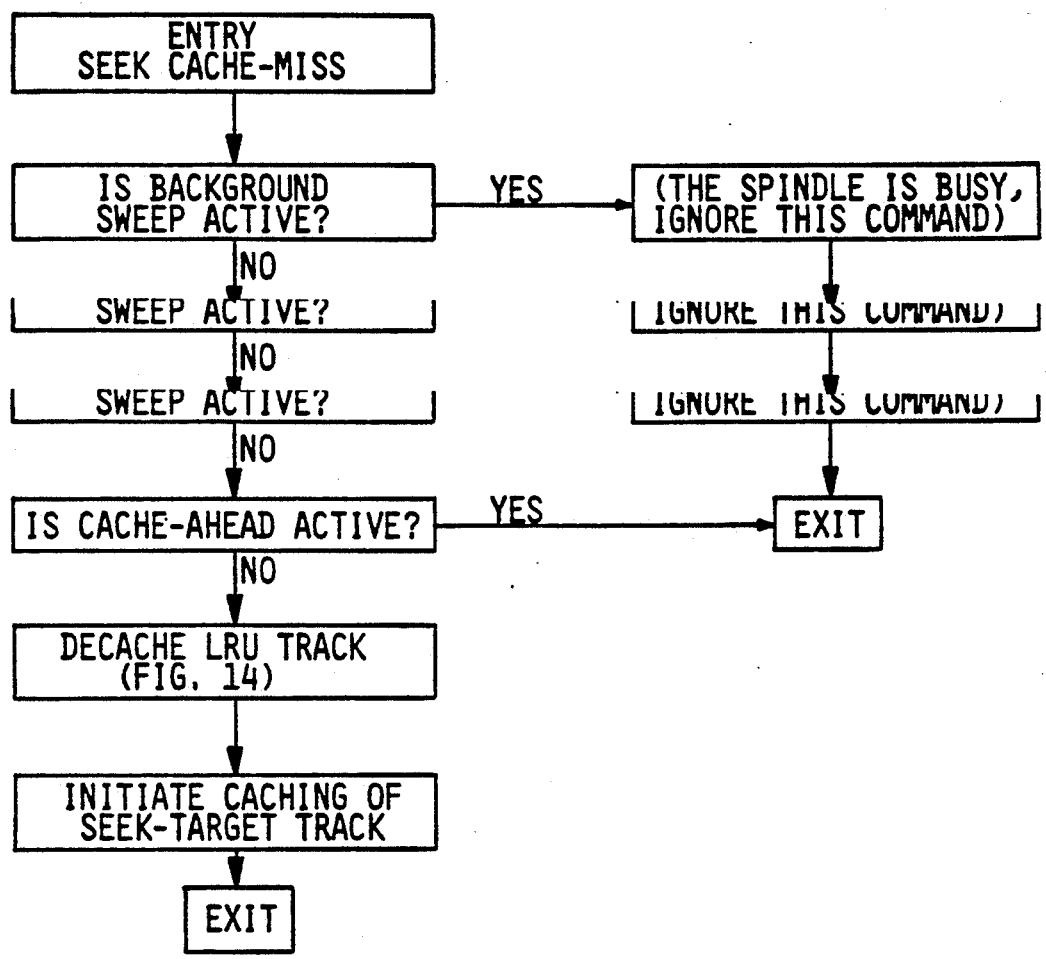
FIG. 13 is a flow chart depicting the seek cache miss operation of FIG. 5.

As shown in FIG. 13, the controller has the option of ignoring a seek command since the controller will ultimately be responsible for fulfilling any subsequent, related I/O command. For a seek command for which the target track is already in cache, no controller action is needed or appropriate. For a seek command for which the target track is not in cache, the controller, if the disk to which the seek is directed is not busy, will cache that target track. This action is based on the assumption that the host would not send a seek command unless it was to be followed by a read or a write command. If the disk to which the seek is directed is busy when a seek command is received from the host, the seek command is ignored.

Decache a Track

Figure 14:
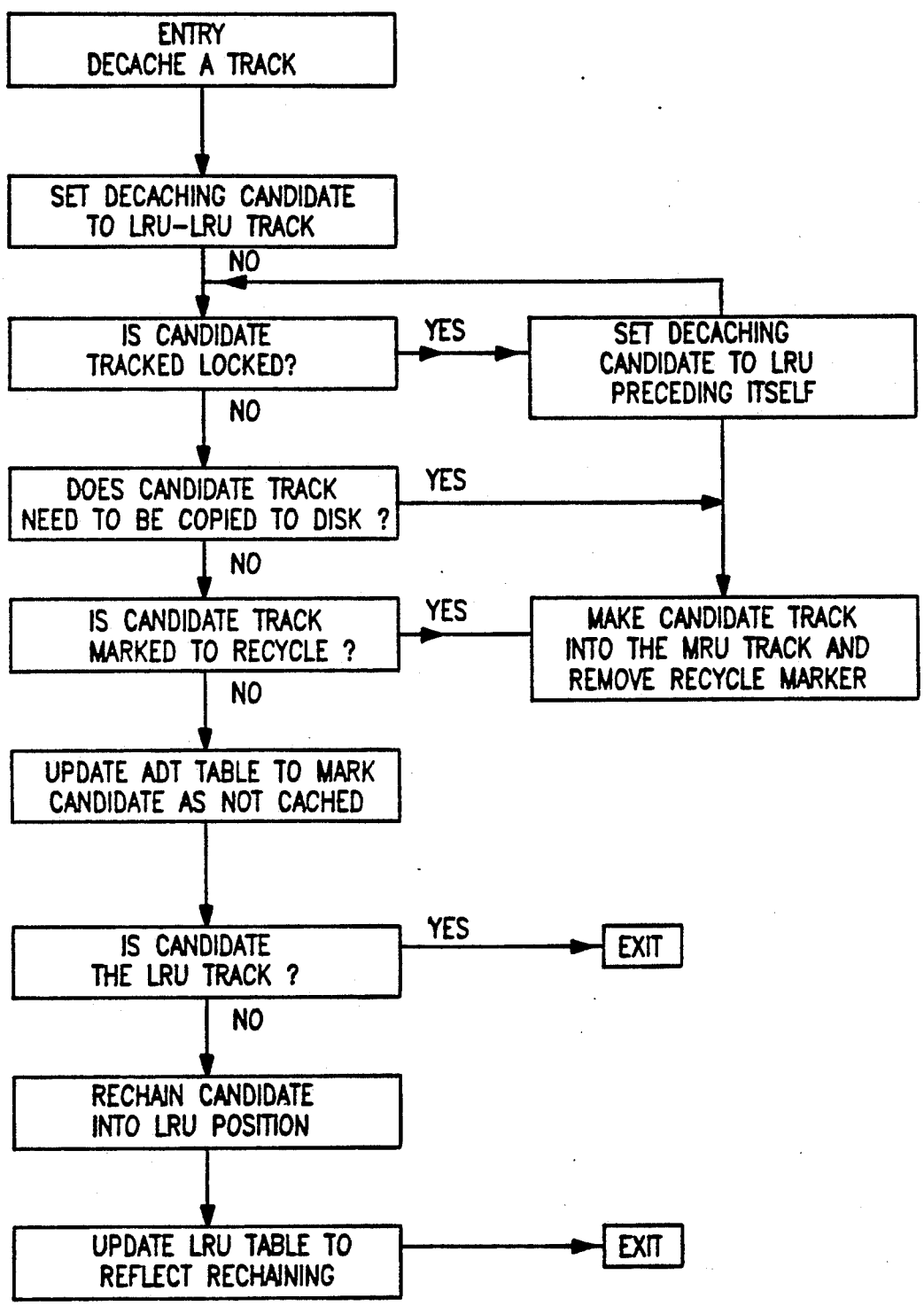
FIG. 14 is a flow chart depicting the decache LRU operation of FIGS. 6, 13 and 15.

For every cache-miss I/O that occurs, and for every cache-ahead operation, some previously cached track or tracks of data must be decached. The primary function of the LRU table is to allow the controller to expeditiously determine which cached track of data is the best candidate for decaching. The decaching module depicted in FIG. 14 chooses the track to be decached. Normally, the track with the longest elapsed time since its last usage will be the track to be decached. This is the track which is pointed to by the LRU-LRU element of the LRU table. The LRU-LRU pointer is maintained in such a way as to always point to the least-recently-used track.

The first condition is that the track must be inactive; that is, it is not at this instant the subject of any activity. It is highly unlikely that the LRU-LRU track would have any activity since most activities would reposition it out of the LRU-LRU spot. However, the possibility is covered by the decaching algorithm.

The second condition that must be satisfied before a track can be decached is that it not be in a modified state in cache. Again this is most improbable when the background sweep algorithm is considered. The background sweep algorithm continually attempts to keep the number of modified tracks to a very low number, on the order of a fraction of one percent of the total cached tracks.

Finally, the track to be decached must not be a candidate for recycling. Any track which has been reused since it was first cached or reused since it was last recycled is not decached. Instead, such a cached track is removed. In this manner, such a track is allowed to remain in cache for a longer time than a track which has not been reused since it was last recycled, or, in the case of a cache-ahead track, since the time it was first cached. The effect of this procedure is to allow unused cache-ahead tracks to move down through the LRU list at a faster rate than those which have been used, and to allow the more useful tracks to remain in cache for a longer time.

If, for any of the above reasons, the LRU-LRU track is unable to be decached, the LRU chain will point to the next-LRU candidate. While it is not unusual for the LRU track to be recycled, it will be an extremely unusual condition in which the decaching module will need to inspect more than one non-recycled LRU slot to find the slot to be decached.

When the actual candidate for decaching has been identified, both the LRU and ADT tables are updated to reflect that the chosen candidate is no longer cached. This is a minor amount of work; no disk activity is involved.

Cache-Ahead Management

Figure 15:
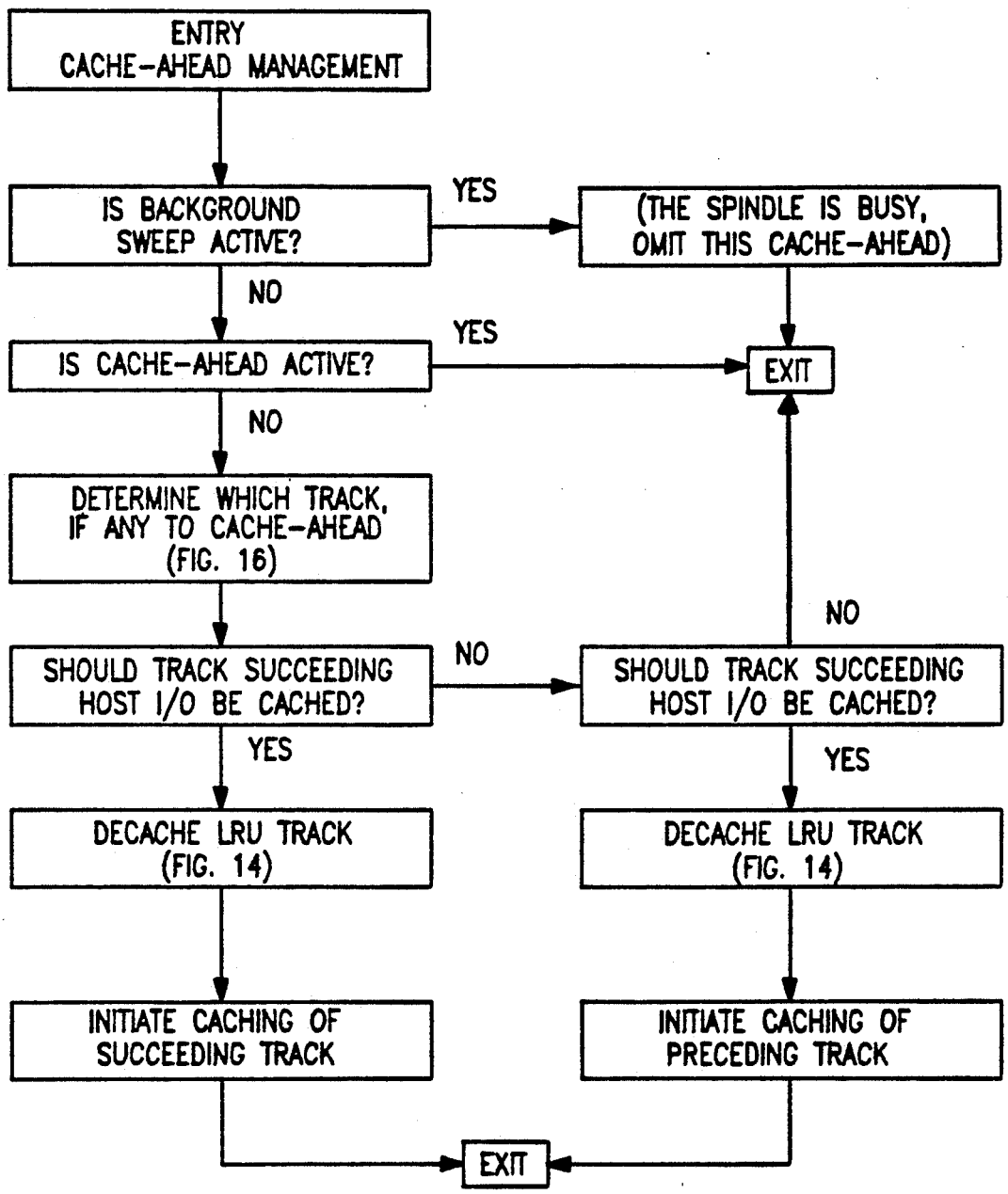
FIG. 15 is a flow chart depicting the cache ahead operation of FIG. 4.
Figure 19:
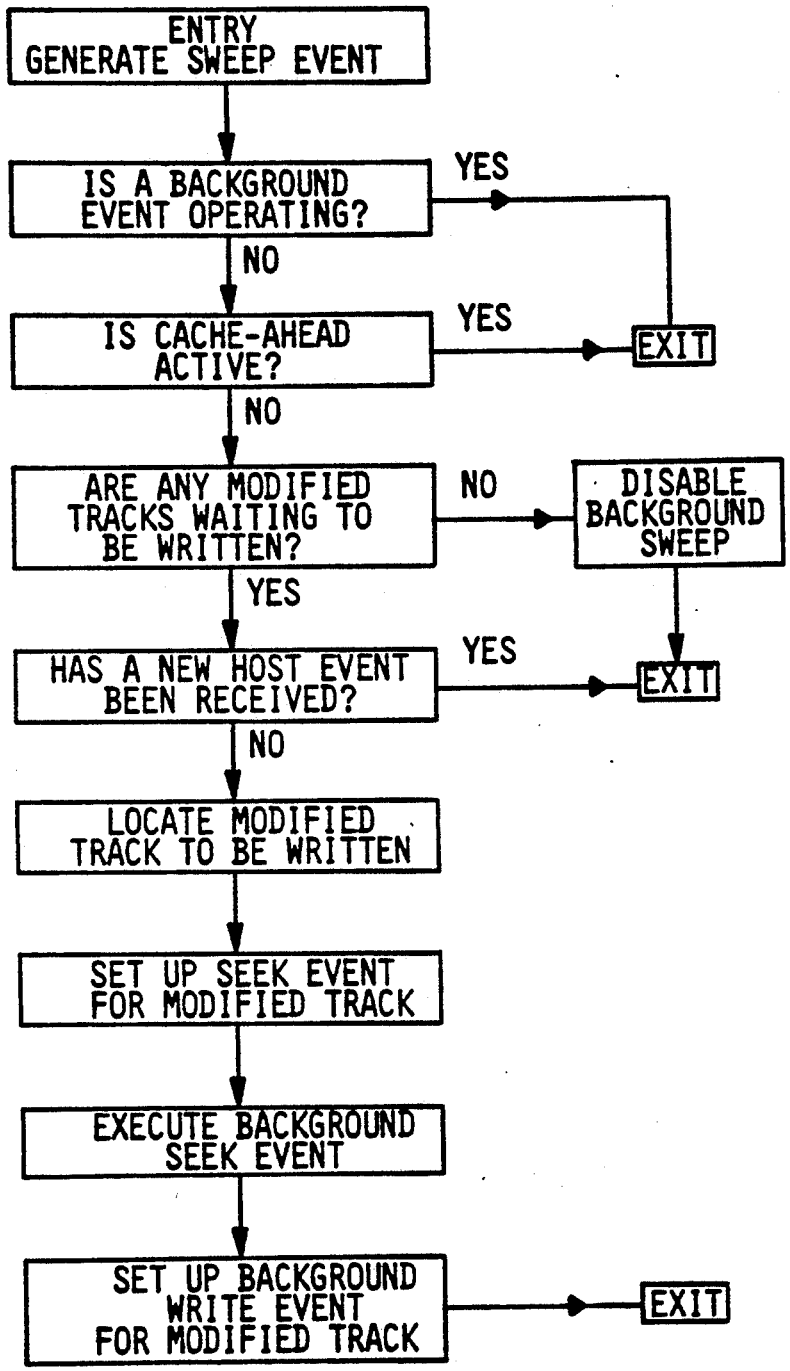
FIG. 19 is a flow chart depicting the generate background event operations depicted in FIGS. 17, 18, and 20.

The cache hit management operation is depicted in FIG. 15. As shown in FIG. 19, the background sweep has a lower priority than host activities, and as shown in FIG. 15, cache-ahead activities have a lower priority than background sweep activities. Since a background sweep has priority over cache-ahead activities, all cache-ahead steps are ignored if the background sweep is active or of a host request exists. If the background sweep is not active, the controller considers the possible need for cache-ahead after every host I/O regardless of whether the I/O was a read or a write, or whether the I/O was a cache hit or cache miss. However, since all cache-ahead action are a background type of activity, and only uses the private channel between disk and cache, they will have a very minimal negative impact on response time to host I/O activity. To further limit the impact, the cache-ahead steps are given a lower priority than any activities required to satisfy an incoming host I/O request and a lower priority than any background sweep activity.

Figure 16:
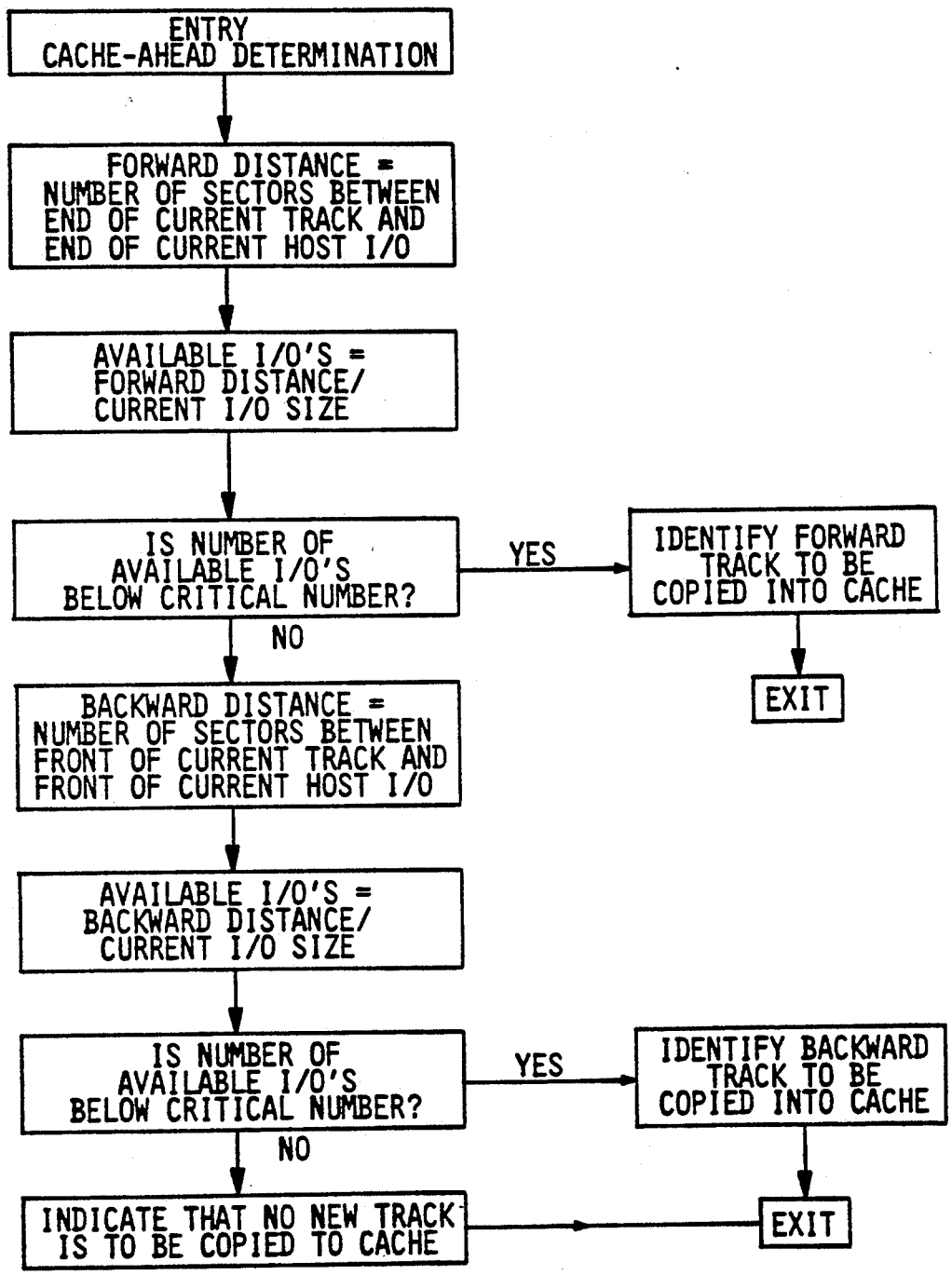
FIG. 16 is a flow chart depicting the operation of the cache ahead determination operation of FIG. 15.

A major factor in limiting the cache-ahead activity is the lack of need for its operation following most host I/O's. As depicted in FIG. 16, the I/O locality feature limits the cache-ahead activity to those circumstances where it is likely that a soon-to occur host I/O would access data beyond the track which satisfied the current I/O. The I/O locality algorithm uses the current I/O block size and its location within the affected track to determine how near the "edge" of the current tack the current I/O was located. If it is determined that a preselected number of like-sized sequential I/O's could be satisfied from this same track without need for an adjacent track, no cache-ahead is performed.

There are only two candidates for cache-ahead: they are the single track immediately following that involved in the host I/O and the track immediately preceding that of the host I/O. Since these tracks will often have already been cached by previous cache-ahead activity, the cache-ahead activity is largely a self-limiting process. To determine if the succeeding data track is already in cache, the ADT-CACHED field of the ADT table in the line next higher than that related to the current track is examined. It will indicate whether or not that succeeding track is in cache. Conversely, the ADT table line next lower to the current track is examined to determine if the preceding track is in cache.

For each host I/O, there is a beginning side of the data accessed by the host as represented, for example, by the I/O's first, or lowest numbered, sector address, and an ending side of the data accessed by the host as represented, for example, by the I/O's last, or highest numbered, sector address.

For each logical track area or block in cache, when it is assigned to a logical disk track, there is also a beginning side as, for example, represented by the first, or lowest numbered, sector address of the assigned logical disk track, and an ending side as, for example, represented by the last, or highest numbered sector address of the assigned logical disk track.

A forward proximity value can be calculated for any host I/O based on the size of that I/O in sectors and the distance between its ending side in cache and the ending side of the logical track area in cache to which the host I/O's logical disk track is assigned.

Likewise, a backward proximity value can be calculated for any host I/O based on the size of that I/O in sectors and the distance between its beginning side in cache and the beginning side of the logical track area in cache to which the host I/O's logical disk track is assigned.

Only one track is cached-ahead for any given host I/O: the track succeeding the host I/O is the primary candidate. If it is not already cached, and the forward proximity value compared to the proximity factor indicates the cache-ahead should occur, the forward track is scheduled for caching at this time. If the succeeding track is already cached, the track preceding the backward proximity value compared to the host I/O is considered; if it is not already cached, and the proximity factor indicates the preceding track should be cached, this preceding track is scheduled for caching at this time. Of course, if both the succeeding and preceding tracks are currently in cache, the cache-ahead module has no need to do any caching. Scheduled cache-ahead operations are carried out as background activities on a lower priority than any activities required to satisfy a host request and at a lower priority than any background sweep activities.

A very important benefit accrues from this forward and/or backward cache-ahead feature. If related tracks are going to be accessed by the host in a sequential mode, that sequence will be either in a forward or backward direction from the first one accessed in a given disk area. By the nature of the cache-ahead algorithm of this invention, an unproductive cache-ahead will only involve one track which lies in the wrong direction from the initial track in any given track cluster. This, coupled with the proximity algorithm, makes the cache-ahead behavior self-adapting to the direction of the accesses.

Background Sweep Management

When a write I/O from the host is serviced by the controller, the data from the host is placed in the cache. It is written from the cache to the disk in the background, minimizing the impact of the disk operations on the time required to service the I/O. The module that handles this background activity is the background sweep module. In the interest of efficiency, the background sweep module does not always copy data from cache to disk as soon as it is available. Rather, it remains dormant until some minimum number of modified tracks are waiting to be copied before going into action. In order to avoid having a single modified track wait an inordinately long time before being copied from cache to disk, the background sweep will also be activated by a timeout. Thus, if any modified track has been waiting a certain minimum time, and the sweep is not active, the sweep will be activated. After the sweep has copied all modified tracks from cache to disk, it returns to a dormant state.

Sweep Timeout

Figure 17:
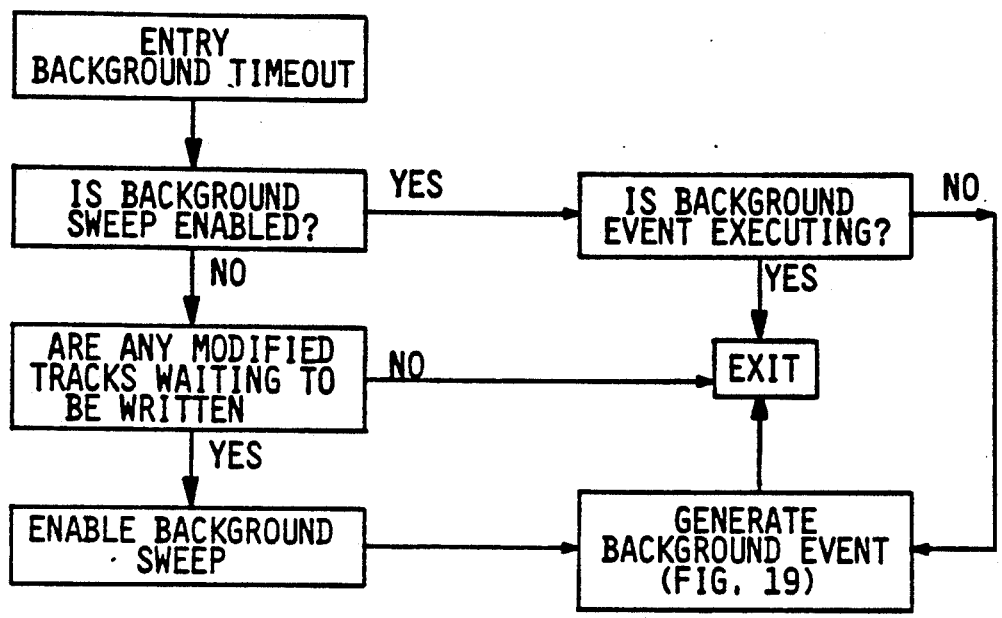
FIG. 17 is a flow chart depicting the operation of the initiate background sweep operation of FIG. 4.

A timeout occurs when some cached data track has been modified and the corresponding track on disk has not been updated after a certain minimum time has elapsed. When a timeout occurs, by definition there will be at least one cached track which needs to be copied to disk. At this time, the background will be changed into the active state. The timeout module (FIG. 17) also causes the first background event to be set up (see description of background event generation), and if no conflict exists with the host for access to the disk, the execution of the event will be initiated. After this event is initiated, the next event, if one is known to be needed, is also set up and held for later execution. When these things have been done, the background sweep waits for circumstances to cause it to continue its operation or to return to a dormant state.

Sweep Initiation

Figure 18:
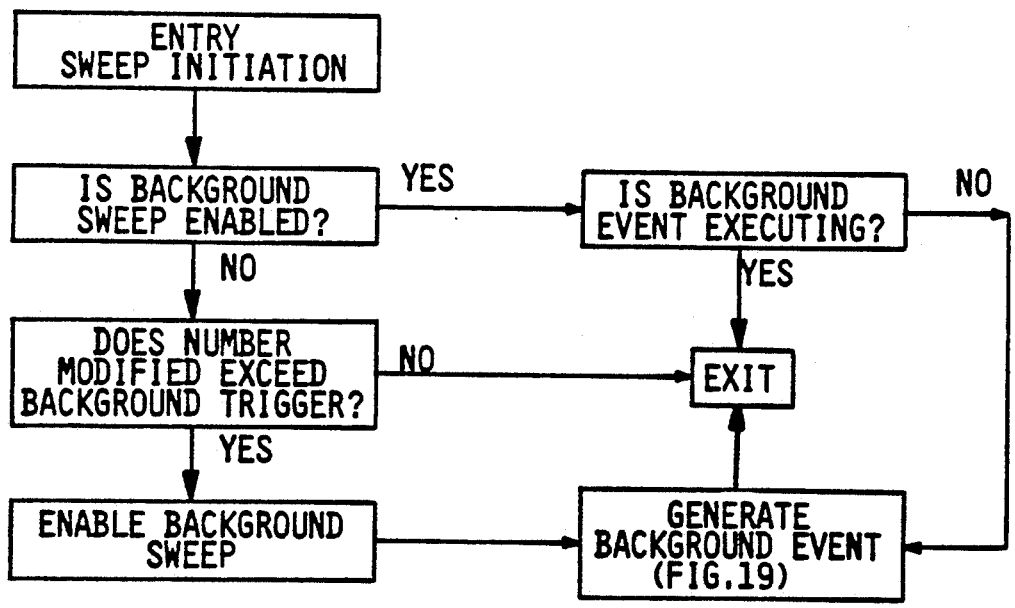
FIG. 18 is a flow chart depicting the step of background sweep initiation at host I/O completion depicted in FIG. 4.

At the completion of each host I/O operation, the sweep initiation module (FIG. 18) is entered. One of three cases may exist. The first case is that the sweep is dormant, and there are not a sufficient number of modified tracks waiting to be copied to disk to cause the sweep to be enabled at this time. In this case, which is the most common one, there is no action to be taken at this time.

In the second case, the sweep is active, and a background event is operating. In this situation, no new action is needed at this time.

In the final case, the sweep is active, but no background event is currently in operation. Under these conditions, a background event is generated (see description of Generate Sweep Event) and, if appropriate, its execution is initiated.

Generate Sweep Event

The need for the generation of a background sweep event is predicated on there being no other ongoing activity involving the disk. If the event generation module of FIG. 19 is entered when any such activity is in progress, no event is generated.

At times, the event generation module will find that there are no more modified tracks waiting to be copied to the disk. In this case, the background sweep is returned to the dormant condition. At other times, the background sweep is in the active mode, but has been temporarily interrupted to handle the higher priority activity of servicing a host I/O. Such interruption requires the background sweep to be restarted. It does this by finding the modified track which is nearest the disk head; initiating a seek to that track; and then setting up a write event for the track. This write event will not be initiated until later, but its existence signals the sweep continuation module (see description of continuation module) that, if possible, this write is the next thing to be done.

The effect of this method of handling background writes is to minimize the impact on the host operations. The controller has an opportunity to service host I/O misses between the background seek and the corresponding write operation. None of this has any significant effect on servicing host I/O cache hits since hits are always handled immediately. The disk is not involved in a hit.

Sweep Continuation

Figure 20:
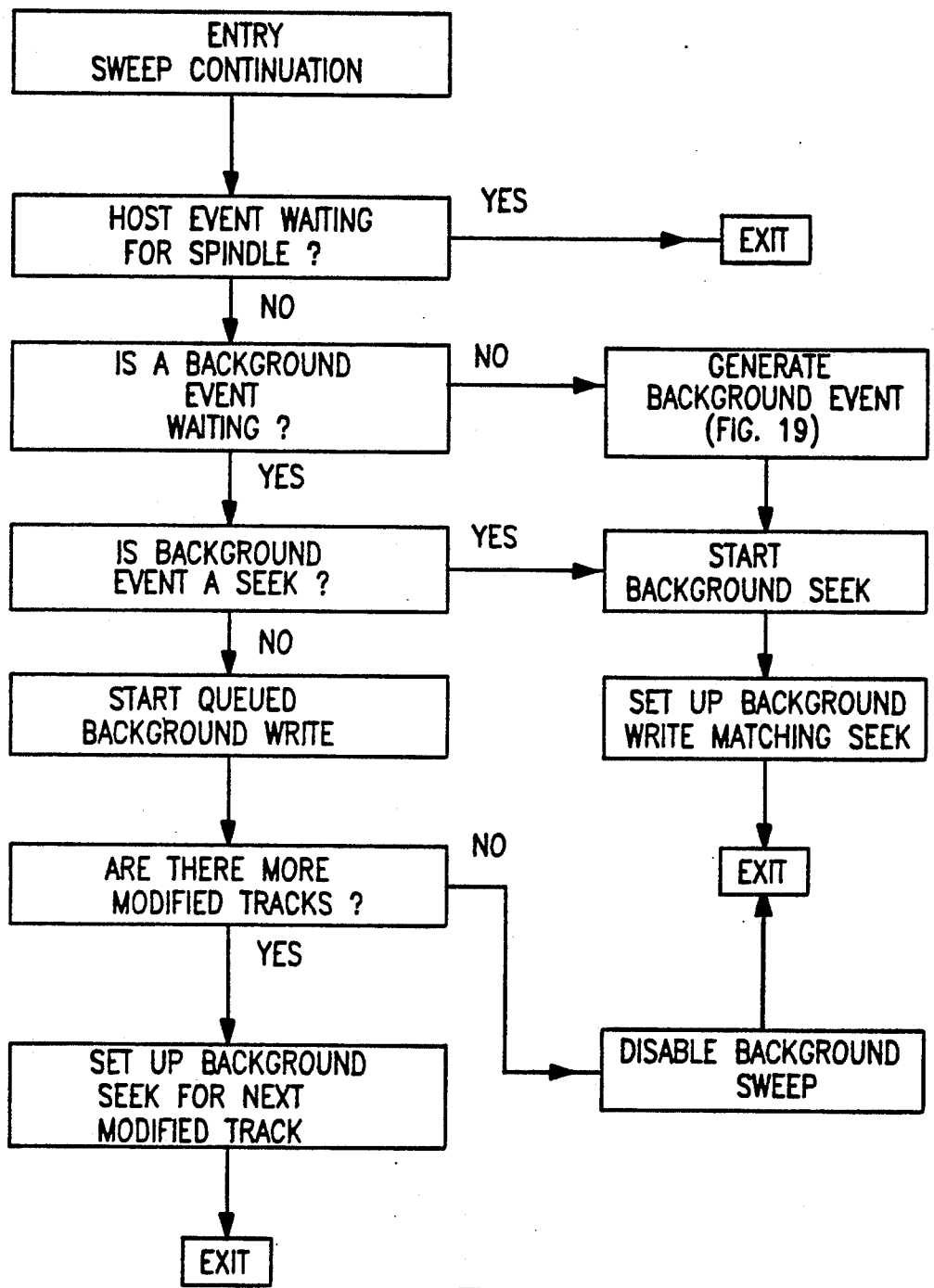
FIG. 20 is a flow chart depicting the operation of the continued background sweep step of FIG. 4.

As depicted in the flow chart of FIG. 20, each background sweep event, whether a seek or a write, prepares a waiting event for the sweep's subsequent action. Thus, the initiation of a seek always prepares the subsequent, related write event; the initiation of a write prepares the subsequent, unrelated seek event, if another track is waiting to be copied to disk.

The continuation module is entered upon the completion of each sweep event. If the host has issued an I/O command which requires the disk (in other words, a cache-miss), the background sweep sequence is interrupted, and the waiting event is erased. This action is taken in order to expedite the servicing of the host's commands, and is taken regardless of the type of sweep event which is waiting. It can result in wasting background seek actions. This is acceptable; the aborted write will be handled later when time permits. Of course, once a sweep command has actually been initiated, it cannot be aborted.

If the sweep continuation module is entered after the sweep operations have been interrupted, it will use the event generation module (see description of event generation) to restart the sweep sequence.

Finally, if the continuation module finds that the just completed sweep operation was a write, and no more modified tracks are waiting to be copied to the disk, the sweep is put into the dormant state.

Power Down Control

Figure 21:
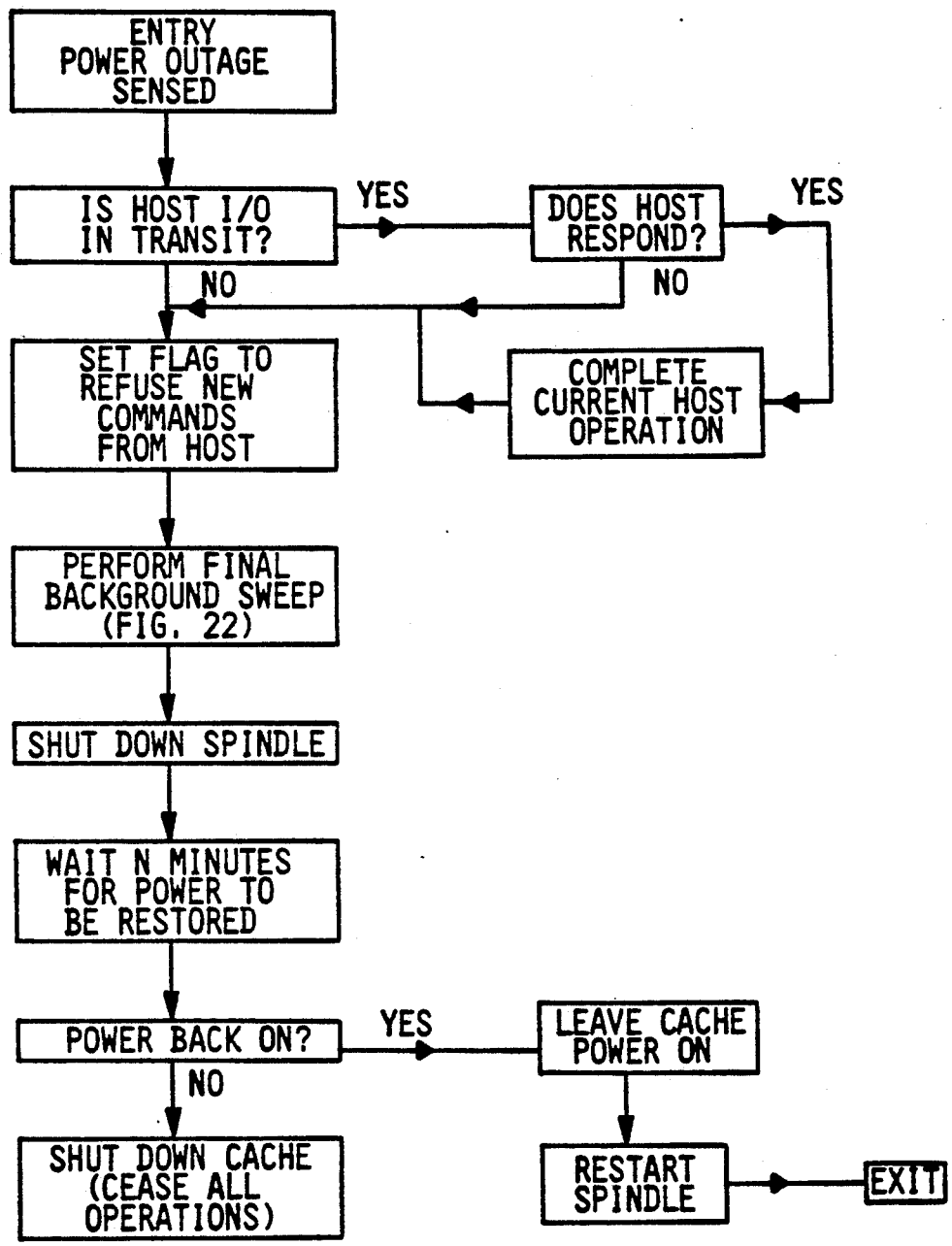
FIG. 21 is a flow chart depicting the power down control operations.

As depicted in the flow chart of FIG. 21, this portion of the firmware is invoked when the system senses that the line power to it has dropped. Since some of the data in the system may be in the cache portion in a modified state and awaiting transfer to the disk, power must be maintained to the cache memory until the modified portions have been written to the disk. Thus, a failure of the line power causes the system to switch to the battery backup unit. The battery backup unit provides power while the memory device goes through an intelligent shutdown process.

If the host is in the process of a data transfer with the memory device when power drops, the shutdown controller allows the transfer in progress to be completed. It then blocks any further transactions with the host from being initiated.

The shutdown controller then must initiate a background sweep to copy any modified data tracks from the solid state memory to the disk so that it will not be lost when power is completely shut off to the control and memory circuits. After the sweep is completed (which will take only a few seconds), all data in the solid state memory will also reside on the disk. At this point the disk spindle can be powered down, reducing the load on the battery.

Most power outages are of a short duration. Therefore, the controller continues to supply battery power to the control circuits and the solid state memory for some number of minutes. If the outside power is restored in this time period, the controller will power the spindle back up and switch back to outside power. In this case, the operation can proceed without having to reestablish the historical data in the solid state memory. In any case, no data is at risk since it is all stored on the rotating magnetic disk before final shutdown.

Final Background Sweep

Figure 22:
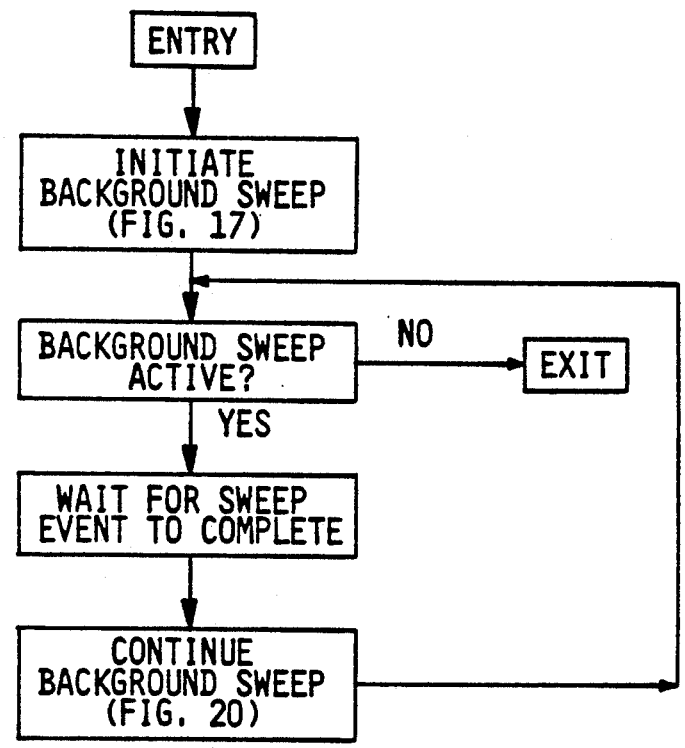
FIG. 22 is a flow chart depicting the final background sweep operation depicted in FIG. 21.
Figure 5:
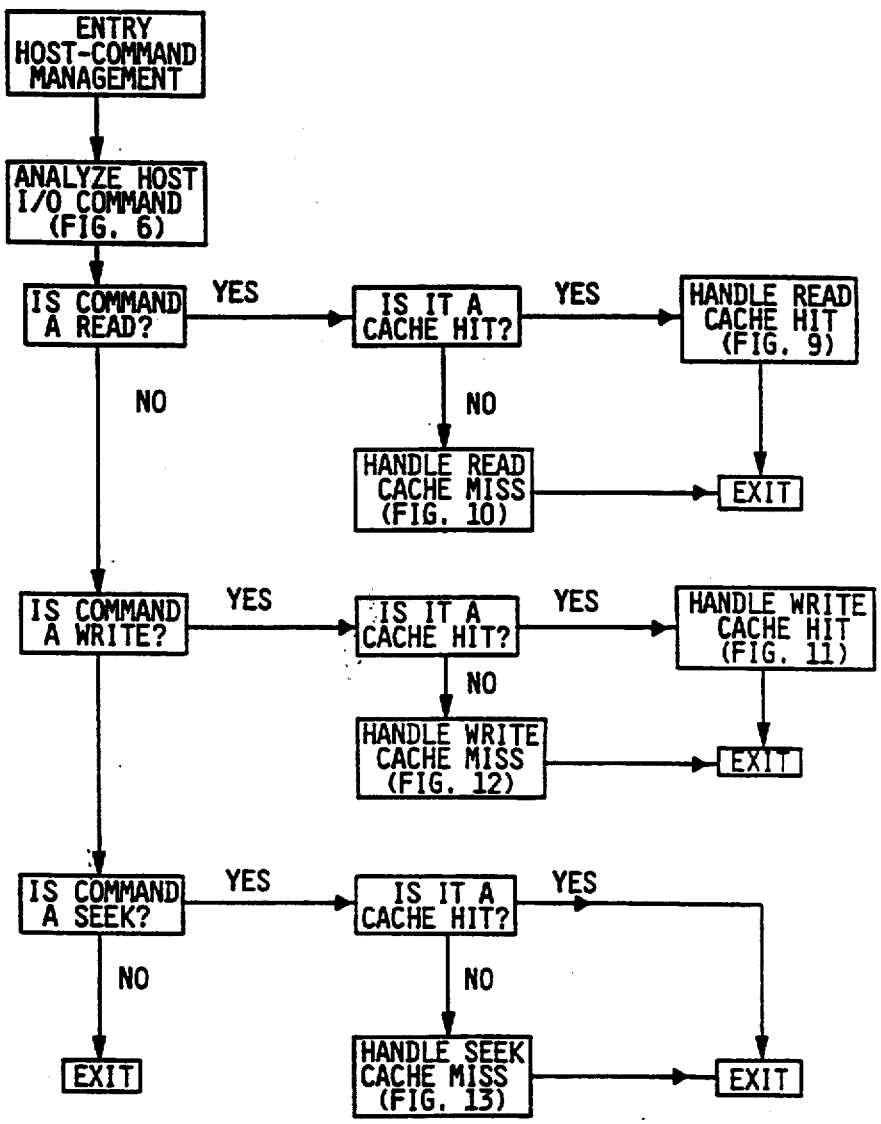
Figure 2:
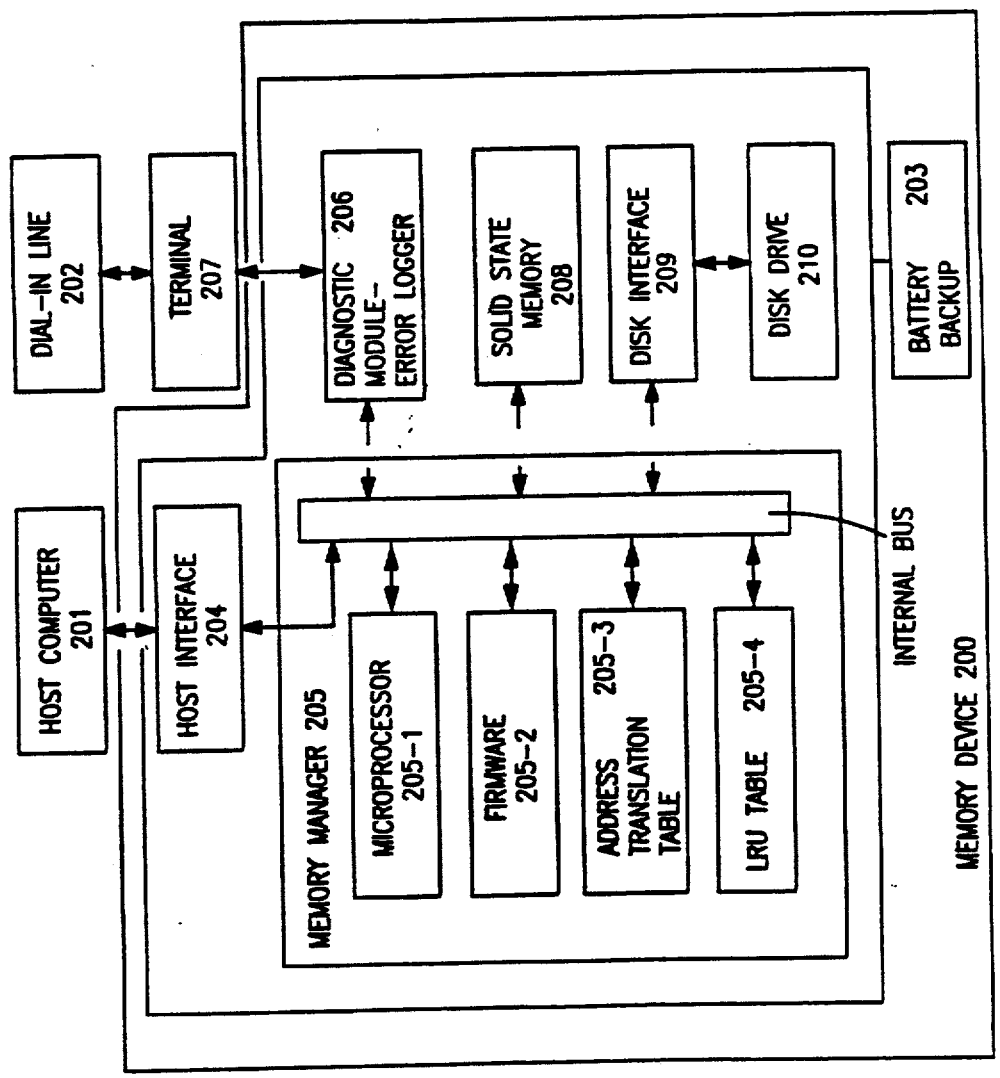
Figure 13:
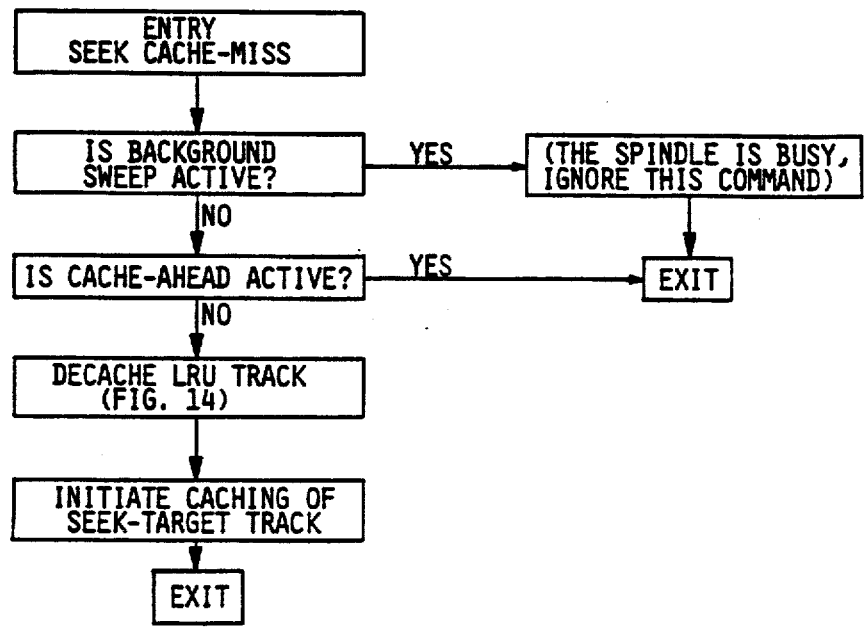
Figure 14:
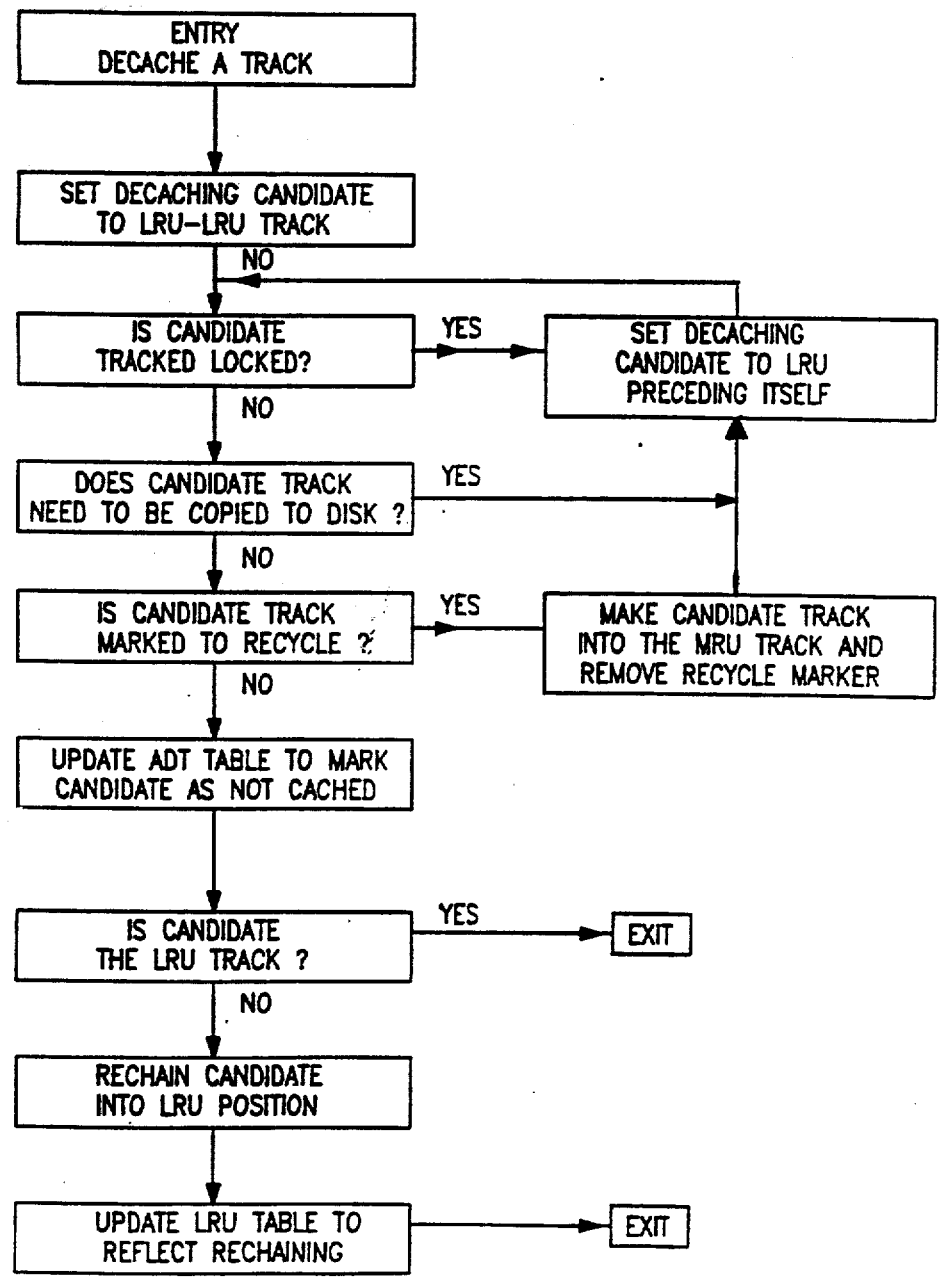

The final background sweep (FIG. 22) copies modified, waiting tracks from the solid state memory to the magnetic disk. There will usually be only a few such tracks to copy since the number that can reach this state is intentionally limited by the operations of the system. The final sweep makes use of logic developed for the normal operation of the background sweep.

The sweep is initiated in much the same manner as for a timeout during normal operation. If no tracks need to be copied, the sweep is left in the dormant state, and no further sweep action is required. If any tracks need copied, the sweep initiator sets up and initiates the first background seek, as well as sets up the related write event. At the completion of this first seek, control goes to the background continuation module which alternately executes the previously created, waiting event and generates the next event and puts it into a wait status. When no modified tracks remain to be copied, the sweep is finished.

Parameters and Particulars

This specification refers to items which are not given specific quantities or identities. These have been purposely left unquantified so as not to imply any absolute limits or restrictions. For purposes of illustration, and to provide known workable dimensions and identifies, the following ranges of values and identifiers are provided, along with a set which is satisfactory for a sample configuration.

BACKGROUND SWEEP TRIGGER, NUMBER OF MODIFIED TRACKS
  Range: One to number of tracks on chosen disk.
  Sample configuration: Five
BACKGROUND SWEEP TRIGGER, TIME
  Range: One millisecond to unlimited.
  Sample configuration: Five seconds.
EPROM MEMORY FOR MICROPROCESSOR
  Size range: Non-specific.
  Sample configuration: 64 kilobytes.
HARDWARE MICROPROCESSOR CONTROLLER
  Candidates: Any suitable and available microprocessor.
  Sample configuration: 80C196, 24 MHz (Intel Corp.).
POWER DOWN, CACHE HOLD TIME
  Range: Zero seconds to limitation imposed by battery back unit.
  Sample configuration: Five minutes.
ROTATING MAGNETIC DISK CAPACITY
  Size range: Any available disk capacity.
  Sample configuration: 675 megabytes formatted.
SCSI CONTROLLER
  Candidates: Any suitable and available controller device.
  Sample configuration: NCR 53C90A (National Cash Register Corp., Dayton, Ohio).
SECTOR SIZE
  Size range: Any appropriate for the host system and the selected disk drive.
  Sample configuration: 180 bytes.
SECTORS PER TRACK
  Range: Any appropriate for selected disk and host system.
  Sample configuration: 256.
SOLID STATE MEMORY SIZE
  Size range: One megabyte to 100 percent of the capacity of the attached disk capacity.
  Sample configuration: 32 megabytes.
TRACK SIZE
  Size range: One sector to any size appropriate for the selected disk drive.
  Sample configuration: 256 sectors.
TRACKS PER DISK
  Range: Any available on chosen disk.
  Sample configuration: 14628.

TABLE F-1

TABLE FORMATS
ADDRESS TRANSLATION (ADT) TABLE FORMAT - UNINDEXED ELEMENTS

| TABLE ITEM | DESCRIPTION |
| --- | --- |
| ADT-CNL | Number of tracks on the cached disk spindle; equals the number of lines in the ADT table. |
| ADT-HEAD-POS | Position of read/write head of cache disk. |
| ADT-SWEEP-DIR | Direction of current DISK SERVER sweep; 1 = sweep is progressing from low-to-high. 0 = sweep is progressing from high-to-low. |
| ADT-MOD-COUNT | Total number of tracks in the cache which have been modified by writes from the host and are currently awaiting a write to disk by the Disk server. |
| ADT-READ-HITS | Number of cache read-hits encountered since last reset. |
| ADT-READ-MISSES | Number of cache read-misses encountered since last reset. |
| ADT-WRITE-HITS | Number of cache write-hits encountered since last reset. |
| ADT-WRITE-MISSES | Number of cache write-misses encountered since last reset. |

TABLE F-2

ADDRESS TRANSLATION TABLE FORMAT - INDEXED ELEMENTS

| TABLE ITEM | MAXIMUM VALUE | ITEM DESCRIPTION |
| --- | --- | --- |
| (INDEX) | (ADT-CNL) | ADT table index; equivalent to the corresponding disk track number. There is one ADT table line for each disk track. |
| ADT-SLOT | (LRU-CNL) | Number of the cache slot which contains the disk track of data corresponding to this ADT index; also points to line in LRU table related to the disk track. If the disk track is not in cache, this field is meaningless and is set to zero. |
| ADT-CACHED | 1 | Flag indicating whether or not the corresponding disk track is stored in the cache. 0 = the track is not in cache. 1 = the track is in cache. |
| ADT-MODIFIED | 1 | Flag indicating whether or not this (cached) track has been modified by a write operation from the host, and thus, needs to be written from the cache to the disk. 0 = This track (if cached) is unmodified and does not need to be written to disk. 1 = This track needs to be written to disk. |
| ADT-LOCKED | 1 | Flag indicating whether or |

TABLE F-2-continued
ADDRESS TRANSLATION TABLE FORMAT - INDEXED ELEMENTS

| TABLE ITEM | MAXIMUM VALUE | ITEM DESCRIPTION |
|---|---|---|
| | | not this (cached) track is currently the target of some operation (locked), such as being acquired from the disk, being modified by the host, or being written to the disk by the cache controller. 0 = the (cached) track is not locked; it is available for any operations. 1 = the (cached) track is the target of an operation and is locked; it cannot, at this moment, become the target of another operation. |

TABLE F-3
LEAST-RECENTLY-USED (LRU) TABLE FORMAT - UNINDEXED ELEMENTS

| TABLE ITEM | DESCRIPTION |
|---|---|
| LRU-CNL | Number of lines in the LRU table; equal to the number of slots in the cache area. |
| LRU-LRU | Pointer to least-recently-used end of the LRU chain. |
| LRU-MRU | Pointer to most-recently-used end of the LRU chain. |

TABLE F-4
LEAST-RECENTLY-USED TABLE FORMAT - INDEXED ELEMENTS

| TABLE ITEM | MAXIMUM VALUE | ITEM DESCRIPTION |
|---|---|---|
| LRU-TRACK | (ADT-CNL) | Disk track number for data stored in this cache slot; also points to line in ADT table related to the disk track. |
| LRU-LAST | (LRU-CNL) | Pointer to preceding link in LRU chain; 0 = this is first (LRU) link in chain. |
| LRU-NEXT | (LRU-CNL) | Pointer to following link in LRU chain; 0 = this is last (MRU) link in chain. |
| LRU-RECYCLE | 1 | Recycle marker; 0 = this is not a candidate for recycling |

TABLE T-1
INITIAL ADT TABLE
ADT-CNL = 14628
ADT-HEAD-POS = 0
ADT-SWEEP-DIR = 1
ADT-MOD-COUNT = 0
ADT-READ-HITS = 0
ADT-READ-MISSES = 0
ADT-WRITE-HITS = 0
ADT-WRITE-MISSES = 0

| DISK TRACK | SSD SLOT | CACHED | MODIFIED | LOCKED |
|---|---|---|---|---|
| 1 | 0 | 0 | 0 | 0 |
| 2 | 0 | 0 | 0 | 0 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| . | . | . | . | . |
| (ADT-CNL) | 0 | 0 | 0 | 0 |

TABLE T-2
INITIAL LRU TABLE
CNL = 22
LRU = 1
MRU = 22

| SSD SLOT | DISK TRACK | LRU LAST | LRU NEXT | LRU RECYCLE | comments |
|---|---|---|---|---|---|
| 1 | 0 | 0 | 2 | 0 | LRU; |
| 2 | 0 | 1 | 3 | 0 | the LRU table |
| 3 | 0 | 2 | 4 | 0 | is aritrarily |
| 4 | 0 | 3 | 5 | 0 | chained to |
| 5 | 0 | 4 | 6 | 0 | allow initial |
| 6 | 0 | 5 | 7 | 0 | operations to |
| 7 | 0 | 6 | 8 | 0 | proceed with |
| 8 | 0 | 7 | 9 | 0 | a minimum of |
| 9 | 0 | 8 | 10 | 0 | special handling |
| 10 | 0 | 9 | 11 | 0 | during startup |
| 11 | 0 | 10 | 12 | 0 | of the caching |
| 12 | 0 | 11 | 13 | 0 | operations |
| 13 | 0 | 12 | 14 | 0 | |
| 14 | 0 | 13 | 15 | 0 | |
| 15 | 0 | 14 | 16 | 0 | |
| 16 | 0 | 15 | 17 | 0 | |
| 17 | 0 | 16 | 18 | 0 | |
| 18 | 0 | 17 | 19 | 0 | |
| 19 | 0 | 18 | 20 | 0 | |
| 20 | 0 | 19 | 21 | 0 | |
| 21 | 0 | 20 | 22 | 0 | |
| 22 | 0 | 21 | 0 | 0 | MRU; arbitrary. |

TABLE T-3a
ADT TABLE AFTER ONE I/O OPERATION
(A read involving tracks 46 and 47)
ADT-CNL = 14628
ADT-HEAD-POS = 47
ADT-SWEEP-DIR = 1
ADT-MOD-COUNT = 0
ADT-READ-HITS = 0
ADT-READ-MISSES = 1
ADT-WRITE-HITS = 0
ADT-WRITE-MISSES = 0

| DISK TRACK | SSD SLOT | CACHED | MODIFIED | LOCKED | comments |
|---|---|---|---|---|---|
| 1 | 0 | 0 | 0 | 0 | |
| 2 | 0 | 0 | 0 | 0 | |
| 3 | 0 | 0 | 0 | 0 | |
| 4 | 0 | 0 | 0 | 0 | |
| 5 | 0 | 0 | 0 | 0 | |
| 6 | 0 | 0 | 0 | 0 | |
| . | . | . | . | . | |
| 46 | 1 | 1 | 0 | 0 | from read-miss (2-track) |
| 47 | 2 | 1 | 0 | 0 | from read-miss (2-track) |
| 48 | 0 | 0 | 0 | 0 | |

TABLE T-3a-continued
ADT TABLE AFTER ONE I/O OPERATION
(A read involving tracks 46 and 47)
ADT-CNL = 14628
ADT-HEAD-POS = 47
ADT-SWEEP-DIR = 1
ADT-MOD-COUNT = 0
ADT-READ-HITS = 0
ADT-READ-MISSES = 1
ADT-WRITE-HITS = 0
ADT-WRITE-MISSES = 0

| DISK TRACK | SSD SLOT | CACHED | MODIFIED | LOCKED | comments |
|---|---|---|---|---|---|
| . | . | . | . | . | |
| 49 (ADT-CNL) | 0 | 0 | 0 | 0 | |

TABLE T-3b
LRU TABLE AFTER ONE READ I/O OPERATION
(A read involving track 46)
LRU-CNL = 22
LRU-LRU = 3
LRU-MRU = 2

| SSD SLOT | DISK TRACK | LAST | NEXT | RECYCLE | comments |
|---|---|---|---|---|---|
| 1 | 46 | 22 | 2 | 1 | cached due to 2-track read-miss |
| 2 | 47 | 1 | 0 | 1 | MRU; second track of read-miss |
| 3 | 0 | 0 | 4 | 0 | new LRU |
| 4 | 0 | 3 | 5 | 0 | |
| 5 | 0 | 4 | 6 | 0 | |
| 6 | 0 | 5 | 7 | 0 | |
| 7 | 0 | 6 | 8 | 0 | |
| 8 | 0 | 7 | 9 | 0 | |
| 9 | 0 | 8 | 10 | 0 | |
| 10 | 0 | 9 | 11 | 0 | |
| 11 | 0 | 10 | 12 | 0 | |
| 12 | 0 | 11 | 13 | 0 | |
| 13 | 0 | 12 | 14 | 0 | |
| 14 | 0 | 13 | 15 | 0 | |
| 15 | 0 | 14 | 16 | 0 | |
| 16 | 0 | 15 | 17 | 0 | |
| 17 | 0 | 16 | 18 | 0 | |
| 18 | 0 | 17 | 19 | 0 | |
| 19 | 0 | 18 | 20 | 0 | |
| 20 | 0 | 19 | 21 | 0 | |
| 21 | 0 | 20 | 22 | 0 | |
| 22 | 0 | 21 | 1 | 0 | old MRU |

TABLE T-3c
LRU TABLE AFTER 1000 I/O OPERATIONS
(A read involving track 56)
LRU-CNL = 22
LRU-LRU = 19
LRU-MRU = 21

| SSD SLOT | DISK TRACK | LAST | NEXT | RECYCLE | comments |
|---|---|---|---|---|---|
| 1 | 62 | 8 | 17 | 0 | |
| 2 | 46 | 12 | 16 | 1 | will be recycled |
| 3 | 215 | 18 | 6 | 0 | |
| 4 | 41 | 15 | 22 | 0 | |
| 5 | 8071 | 13 | 21 | 0 | |
| 6 | 58 | 3 | 10 | 0 | |
| 7 | 45 | 11 | 13 | 1 | will be recycled |
| 8 | 61 | 9 | 1 | 0 | |
| 9 | 48 | 14 | 8 | 0 | |
| 10 | 43 | 6 | 15 | 0 | |
| 11 | 44 | 17 | 7 | 1 | will be recycled |
| 12 | 52 | 22 | 2 | 0 | |
| 13 | 214 | 7 | 5 | 1 | will be recycled |
| 14 | 65 | 20 | 9 | 0 | |
| 15 | 42 | 10 | 4 | 0 | |
| 16 | 57 | 2 | 20 | 0 | |
| 17 | 63 | 1 | 11 | 0 | |
| 18 | 213 | 19 | 3 | 1 | will be recycled |
| 19 | 212 | 0 | 18 | 1 | LRU, oldest usage; will be recycled |
| 20 | 66 | 16 | 14 | 0 | |
| 21 | 56 | 5 | 0 | 0 | MRU; newest usage |
| 22 | 67 | 4 | 12 | 0 | |

TABLE T-3d
LRU TABLE AFTER 1001 I/O OPERATIONS
(A write involving tracks 61 and 62)
LRU-CNL = 22
LRU-LRU = 6
LRU-MRU = 1

| SSD SLOT | DISK TRACK | LAST | NEXT | RECYCLE | comments |
|---|---|---|---|---|---|
| 1 | 62 | 8 | 0 | 0 | new MRU |
| 2 | 46 | 12 | 16 | 1 | |
| 3 | 55 | 18 | 8 | 0 | |
| 4 | 41 | 15 | 22 | 0 | |
| 5 | 8071 | 13 | 21 | 0 | |
| 6 | 58 | 0 | 10 | 0 | new LRU |
| 7 | 45 | 11 | 13 | 1 | |
| 8 | 61 | 3 | 1 | 0 | |
| 9 | 48 | 14 | 17 | 0 | |
| 10 | 43 | 6 | 15 | 0 | |
| 11 | 44 | 17 | 7 | 1 | |
| 12 | 52 | 22 | 2 | 0 | |
| 13 | 214 | 1 | 5 | 1 | |
| 14 | 65 | 20 | 9 | 0 | |
| 15 | 42 | 10 | 4 | 0 | |
| 16 | 57 | 2 | 20 | 0 | |
| 17 | 63 | 9 | 11 | 0 | |
| 18 | 213 | 19 | 3 | 0 | recycled |
| 19 | 212 | 21 | 18 | 0 | old LRU; recycled |
| 20 | 66 | 16 | 14 | 0 | |
| 21 | 56 | 5 | 19 | 0 | old MRU |
| 22 | 67 | 4 | 12 | 0 | |

TABLE T-3e
LRU TABLE AFTER 1002 I/O OPERATIONS
(A write involving track 214)
LRU-CNL = 22
LRU-LRU = 6
LRU-MRU = 13

| SSD SLOT | DISK TRACK | LAST | NEXT | RECYCLE | comments |
|---|---|---|---|---|---|
| 1 | 62 | 8 | 13 | 0 | |
| 2 | 46 | 12 | 16 | 1 | |
| 3 | 55 | 18 | 8 | 0 | |
| 4 | 41 | 15 | 22 | 0 | |
| 5 | 8071 | 7 | 21 | 0 | |
| 6 | 58 | 0 | 10 | 0 | LRU; unchanged |
| 7 | 45 | 11 | 5 | 1 | |
| 8 | 61 | 3 | 1 | 0 | |
| 9 | 48 | 14 | 17 | 0 | |
| 10 | 43 | 6 | 15 | 0 | |
| 11 | 44 | 17 | 7 | 1 | |
| 12 | 52 | 22 | 2 | 0 | |
| 13 | 214 | 1 | 0 | 1 | new MRU |
| 14 | 65 | 20 | 9 | 0 | |
| 15 | 42 | 10 | 4 | 0 | |
| 16 | 57 | 2 | 20 | 0 | |
| 17 | 63 | 9 | 11 | 0 | |
| 18 | 213 | 19 | 3 | 0 | |
| 19 | 212 | 21 | 18 | 0 | |

TABLE T-3e-continued

LRU TABLE AFTER 1002 I/O OPERATIONS
(A write involving track 214)
LRU-CNL = 22
LRU-LRU = 6
LRU-MRU = 13

| SSD SLOT | DISK TRACK | LAST | NEXT | RECYCLE | comments |
|---|---|---|---|---|---|
| 20 | 66 | 16 | 14 | 0 | |
| 21 | 56 | 5 | 19 | 0 | |
| 22 | 67 | 4 | 12 | 0 | |

TABLE 4

Sample I/O's for Illustration
The LRU and ADT table examples are based on I/O samples taken from an actual operating computer system and projected into the system's environment.
For each I/O, the following information is available:

| (I/O REF NBR) | SECTOR ADDRESS | SIZE IN SECTORS | (COMPUTED TRACK NUMBER) | comment |
|---|---|---|---|---|
| 1 | 11,742 | 68 | 46, 47 | read starts in 46, ends in 47 |
| . | . | . | . | |
| . | . | . | . | |
| . | . | . | . | |
| 1000 | 14,190 | 68 | 56 | read completely in 56 |
| 1001 | 15,550 | 68 | 61, 62 | write starts in 61, ends in 62 |
| 1002 | 54,582 | 68 | 214 | write entirely in 214 |
| . | . | . | . | |
| . | . | . | . | |
| . | . | . | . | |

The invention now being fully described, it will be apparent to one or ordinary skill in the art that many changes and modifications can be made thereto without departing from the spirit or scope of the appended claims.

What is claimed is:

1. A method for operating a cache memory system serving a host computer, said cache memory system including a mass storage device and a cache memory having a plurality of logical blocks, each logical block having a beginning and an end, and each logical block containing one or more sectors, said method comprising the steps of:
   providing a first logical block of said cache memory for containing data accessed by said host; and
   performing a cache ahead operation comprising the steps of:
      determining that there is no second logical block of said cache memory which contains data that is stored at one or more locations within said mass storage device adjacent a first side of data stored in said first logical block of said cache memory, said first side being selected as a first one of the beginning and the end of data stored in said first logical block;
      determining a first distance measured in sectors between a first side of the data accessed by said host which is stored within said cache memory and a first side of said first logical block of said cache memory, said first side of said first logical block being selected as one of the beginning and the end of said first logical block;
      based on the size of the current host I/O operation, measured in sectors, determining the number of sequential host I/O operations required to transfer to said host computer data located within said cache memory between said data accessed by said host and said first side of said first logical block;
      determining if said number of host I/O operations required is less than a first preselected number; and
      if said number of host I/O operations required is less than said first preselected number, copying into a second logical block of said cache memory data which is stored at one or more locations within said mass storage device adjacent data corresponding to data stored at said first side of said first logical block of said cache memory.

2. A method as in claim 1 wherein said first distance is a forward distance measured in sectors from the end of said data accessed by said host to the end of said first logical block of said cache memory.

3. A method as in claim 1 wherein said first distance is a backward distance measured in sectors from the beginning of said data accessed by said host to the beginning of said first logical block of said cache memory.

4. A method as in claim 1 wherein said plurality of logical blocks of said cache memory comprise a plurality of logical blocks dynamically assigned to correspond to logical blocks of said mass storage device.

5. A method as in claim 1 wherein said step of copying comprises the steps of:
   determining if data to be copied from said mass storage device has already been stored within said cache memory; and
   if not, copying said data to be copied from said mass storage device into a second logical block of said cache memory.

6. A method as in claim 1 wherein said step of performing a cache ahead operation is performed at a lower priority than other requests for access to data stored in said mass storage device.

7. A method as in claim 1 wherein said step of copying is performed using a data channel separate from a data path used by a host to access said cache memory system.

8. A method as in claim 1 which further comprises the steps of:
   if said number of host I/O operations required is greater than said first preselected number, or if it has been determined that there is a second logical block of said cache memory which contains data that is stored at one or more locations within said mass storage device adjacent the first side of data stored in said first logical block of said cache memory;
   determining that there is no third logical block of said cache memory which contains data that is stored at one or more locations within said mass storage device adjacent a second side of data stored in said first logical block of said cache memory, said second side being selected as a second one of the beginning and the end of data stored in said first logical block;
   determining a second distance measured in sectors between the first side of the data accessed by said host which is stored within said cache memory and a second side of said first logical block of said cache memory;

based on the size of the current host I/O operation, measured in sectors, determining a second number of sequential host I/O operations required to transfer to said host computer data located within said cache memory between said data accessed by said host and said second side of said first logical block;

determining if said second number of host I/O operations required is less than a second preselected number; and if said second number of host I/O operations required is less than said second preselected number, copying into a third logical block of said cache memory data which is stored at one or more locations within said mass storage device adjacent data corresponding to data stored at said second side of said first logical block of said cache memory.

9. A method as in claim 8 wherein said steps of performing a cache ahead operation is performed at a lower priority than other requests for access to data stored in said mass storage device.

10. A method as in claim 8 wherein said steps of copying are performed using a data channel separate from a data path used by a host to access said cache memory system.

11. A method as in claim 8 wherein said plurality of logical blocks of said cache memory comprise a plurality of logical blocks dynamically assigned to correspond to logical blocks of said mass storage device.

* * * * *

UNITED STATES PATENT AND TRADEMARK OFFICE
CERTIFICATE OF CORRECTION

PATENT NO. : 5,325,509
DATED : June 28, 1994
INVENTOR(S) : Marvin Lautzenheiser

It is certified that error appears in the above-indentified patent and that said Letters Patent is hereby corrected as shown below:

The Drawing Sheet consisting of Fig. 2, Fig. 5, Fig. 13, and Fig. 14, should be deleted to be replaced with the drawing sheet, consisting of Fig. 2, Fig. 5, Fig. 13, and Fig. 14, as shown on the attached pages.

Column 4, line 62, delete "describes the least recently used (LRU) table" and insert --is formed of--;

Column 4, line 64, after "T-3e" insert --which--.

Signed and Sealed this

Fourth Day of April, 1995

Attest:

BRUCE LEHMAN

*Attesting Officer*  *Commissioner of Patents and Trademarks*